US010051688B1

(12) United States Patent
Huang et al.

(10) Patent No.: US 10,051,688 B1
(45) Date of Patent: Aug. 14, 2018

(54) BRIDGING WIRELESS NETWORK TRAFFIC

(71) Applicant: Marvell International Ltd., Hamilton (BM)

(72) Inventors: Frank Huang, Dublin, CA (US); Hao Li, Jiangsu (CN); Tao Song, Shanghai (CN); Amey Dattatray Inamdar, Maharashtra (IN); Tian Li, San Jose, CA (US); Timothy J. Donovan, Livermore, CA (US)

(73) Assignee: Marvell International Ltd., Hamilton (BM)

( * ) Notice: Subject to any disclaimer, the term of this patent is extended or adjusted under 35 U.S.C. 154(b) by 129 days.

(21) Appl. No.: 15/166,188

(22) Filed: May 26, 2016

Related U.S. Application Data

(60) Provisional application No. 62/167,409, filed on May 28, 2015.

(51) Int. Cl.
  *H04W 88/12* (2009.01)
  *H04W 92/02* (2009.01)
  (Continued)

(52) U.S. Cl.
  CPC ........... *H04W 92/02* (2013.01); *H04L 61/103* (2013.01); *H04L 61/2015* (2013.01);
  (Continued)

(58) Field of Classification Search
  CPC . H04W 92/02; H04W 76/002; H04W 28/065; H04W 52/0206; H04W 84/12;
  (Continued)

(56) References Cited

U.S. PATENT DOCUMENTS 5,708,655 A   1/1998   Toth et al.
6,728,232 B2  4/2004   Hasty et al.
(Continued)

FOREIGN PATENT DOCUMENTS

WO    WO2010083887 A1    7/2010

OTHER PUBLICATIONS

"IEEE 802.11", Wikipedia, downloaded from the Internet, https://en.wikipedia.org/wiki/IEEE_802.11, Nov. 16, 2015, 13 Pages.
(Continued)

*Primary Examiner* — Hashim Bhatti

(57) ABSTRACT

A wireless network bridge controls a first network interface to operate as a first station in a first wireless network, and controls a second network interface to operate as an access point in a second wireless network. The bridge controls a bridge table that includes an entry associating one or more network addresses of a second station with the second network interface. The second station is accessible through the second network interface operating as an access point. The bridge receives a packet for communication between the second station and a network device in the first wireless network; examines the packet to find one or more network addresses included in the packet; associates the packet with the second station by performing a lookup of the bridge table; and communicates packet information with the second station through the second network interface, and with the network device through the first network interface.

32 Claims, 8 Drawing Sheets

(51) Int. Cl.
*H04L 29/12* (2006.01)
*H04L 29/08* (2006.01)
*H04W 52/02* (2009.01)
*H04L 29/06* (2006.01)
*H04W 28/06* (2009.01)
*H04W 76/00* (2018.01)
*H04W 76/40* (2018.01)
*H04W 84/12* (2009.01)

(52) U.S. Cl.
CPC .......... *H04L 61/2023* (2013.01); *H04L 63/08* (2013.01); *H04L 63/10* (2013.01); *H04L 67/145* (2013.01); *H04L 69/22* (2013.01); *H04W 28/065* (2013.01); *H04W 52/0206* (2013.01); *H04W 76/002* (2013.01); *H04W 76/40* (2018.02); *H04W 84/12* (2013.01)

(58) Field of Classification Search
CPC ..... H04L 61/2023; H04L 63/10; H04L 69/22; H04L 63/08; H04L 61/2015; H04L 67/145; H04L 61/103
See application file for complete search history.

(56) References Cited

U.S. PATENT DOCUMENTS

| | | | |
|---|---|---|---|
| 6,993,583 B2 | 1/2006 | Anderson et al. | |
| 7,660,258 B2 | 2/2010 | Cho et al. | |
| 7,793,005 B1 | 9/2010 | Fernald et al. | |
| 8,006,276 B2 | 8/2011 | Nakagawa et al. | |
| 8,036,520 B2 | 10/2011 | Narukawa et al. | |
| 8,095,671 B2 | 1/2012 | Balogh | |
| 8,102,826 B2 | 1/2012 | Lee | |
| 8,116,233 B2 | 2/2012 | Lambert et al. | |
| 8,166,296 B2 | 4/2012 | Buer et al. | |
| 8,238,315 B2 | 8/2012 | Lambert | |
| 8,364,831 B2 | 1/2013 | Balogh | |
| 8,392,850 B2 | 3/2013 | Nakagawa et al. | |
| 8,446,843 B2 | 5/2013 | Lambert | |
| 8,451,862 B2 | 5/2013 | Huang et al. | |
| 8,732,283 B2 | 5/2014 | Lambert et al. | |
| 8,812,723 B2 | 8/2014 | Lambert et al. | |
| 8,886,833 B1 | 11/2014 | Kopikare et al. | |
| 9,055,430 B2 | 6/2015 | Lambert | |
| 9,137,255 B2 | 9/2015 | Lambert | |
| 9,571,199 B1* | 2/2017 | Bannon ................. H04B 10/40 | |
| 9,681,374 B2* | 6/2017 | Cui ................... H04W 52/0206 | |
| 9,756,682 B2* | 9/2017 | Iyer ....................... H04W 84/12 | |
| 2001/0003191 A1 | 6/2001 | Kovacs et al. | |
| 2003/0081578 A1 | 5/2003 | White et al. | |
| 2004/0213271 A1 | 10/2004 | Lovy et al. | |
| 2004/0240474 A1 | 12/2004 | Fan | |
| 2005/0188069 A1 | 8/2005 | Mohandas | |
| 2005/0191990 A1 | 9/2005 | Willey et al. | |
| 2006/0256717 A1 | 11/2006 | Cad | |
| 2006/0267936 A1 | 11/2006 | Hoerl et al. | |
| 2007/0204021 A1 | 8/2007 | Eki et al. | |
| 2008/0205649 A1 | 8/2008 | Harris et al. | |
| 2009/0234910 A1 | 9/2009 | Chung et al. | |
| 2010/0031318 A1 | 2/2010 | Gardcia et al. | |
| 2010/0054154 A1 | 3/2010 | Lambert et al. | |
| 2010/0067509 A1 | 3/2010 | Lambert | |
| 2010/0296441 A1 | 11/2010 | Barkan | |
| 2011/0103302 A1 | 5/2011 | Hall | |
| 2011/0282998 A1 | 11/2011 | Johnsson et al. | |
| 2011/0292922 A1* | 12/2011 | Yang ....................... H04L 45/60 370/338 | |
| 2012/0314621 A1* | 12/2012 | Finn ....................... H04W 4/16 370/254 | |
| 2014/0050209 A1 | 2/2014 | Bajko et al. | |
| 2014/0229634 A1 | 8/2014 | Lambert et al. | |
| 2014/0269476 A1* | 9/2014 | Weston ............. H04W 52/0206 370/311 | |
| 2015/0195198 A1* | 7/2015 | Shin ....................... H04L 45/74 370/392 | |
| 2015/0281947 A1 | 10/2015 | Patil et al. | |
| 2016/0112947 A1* | 4/2016 | Sahoo ................... H04W 4/008 370/311 | |
| 2016/0344681 A1 | 11/2016 | Lambert et al. | |
| 2017/0171111 A1* | 6/2017 | Khare ..................... H04L 49/30 | |

OTHER PUBLICATIONS

"IEEE P802.11—Task Group AI—Meeting Update", IEEE P802.11 FIA Study Group, downloaded from the Internet, http://www.ieee802.org/11/Reports/tgai_update.htm, Nov. 2, 2015, 29 pages.

"IEEE 802.11ai", Wikipedia, downloaded from the Internet, https://en.wikipedia.org/wiki/IEEE_802.11ai, Nov. 2, 2015, 1 page.

"Dynamic Host Configuration Protocol", Wikipedia, downloaded from the Internet, https://en.wikipedia.org/wiki/Dynamic_Host_Configuration_Protocol, Nov. 2, 2015, 19 pages.

Chen et al., "Scalable Address Allocation Protocol for Mobile Ad Hoc Networks," 2009, Fifth International Conference on Mobile Ad-hoc and Sensor Networks, IEEE Computer Society, 41-48, 8 pages.

Johnson, et al., "Subnet Allocation Option" Internet Engineering Task Force, Internet Society (ISOC), May 13, 2010, pp. 1-30.

Mohsin et al., "IP address assignment in a mobile ad hoc network", IEEE Military Communications Conference, Oct. 7, 2002, pp. 856-861.

IBSS with Wi-Fi Protected Setup Technical Specification v.1.0.0, Wi-Fi Alliance Technical Committee IBSS with Wi-Fi Protected Setup Technical Task Group, 2012, 76 pages.

U.S. Appl. No. 15/153,666, Office Action dated Nov. 3, 2017, 15 pages.

\* cited by examiner

US 10,051,688 B1

BRIDGING WIRELESS NETWORK TRAFFIC

CROSS REFERENCE TO RELATED APPLICATIONS

This application claims the benefit of priority under 35 U.S.C. § 119(e) of U.S. Provisional Application No. 62/167,409, filed on May 28, 2015, and entitled "Internet of Things WiFi Bridge and Bridging Method," which is incorporated herein by reference in its entirety.

BACKGROUND

The following disclosure relates generally to systems and techniques for bridging wireless network traffic.

Network devices can communicate with one another using wireless communication, e.g., in a wireless network based on Institute of Electrical and Electronics Engineers (IEEE) 802.11 family of protocols. Some network devices may be directly connected to an access point (AP) in a wireless network. Some devices may not receive strong signals from the AP, and a network bridge device can be used to connect such devices to the wireless network.

SUMMARY

The present disclosure describes devices, systems and techniques for using a wireless network bridge to connect network devices to a wireless network. The wireless network bridge, which is also referred to simply as a bridge, is used to connect, to an access point (AP) in the wireless network, one or more Internet of Things (IoT) network devices that are outside the range of direct connections to the AP. The bridge includes multiple network interfaces. The bridge connects to the AP in the wireless network using a first network interface, and operates as a client network device in the wireless network.

The bridge includes one or more additional network interfaces at which it creates one or more internal wireless networks. In each of these internal wireless networks, the bridge acts as an access point using the respective network interface. Network devices, including IoT network devices, connect as stations to the internal wireless networks. The bridge can derive service set identifiers (SSIDs) and passwords for the internal wireless networks based on the SSID and password of the AP in the larger wireless network, which is also referred to as the external wireless network to differentiate from the internal wireless networks created by the bridge.

The bridge maintains a bridge table, which includes entries mapping the network layer addresses and datalink layer addresses of the IoT network devices connected to the internal wireless networks of the bridge to the corresponding bridge network interfaces where these network devices are connected. The bridge forwards wireless frames and packets between the IoT network devices in the internal wireless networks and stations in the external wireless network by performing address translation using the bridge table. Using the bridge table, the bridge is configured to perform proxy Address Resolution Protocol (proxy ARP) exchange, Dynamic Host Configuration Protocol (DHCP) forwarding, Internet Protocol version 6 (IPv6) packet forwarding, among other functions.

In a general aspect, a wireless network bridge apparatus comprises one or more processors and a storage medium storing instructions that, when executed by the one or more processors, are configured to cause the processors to control a first network interface to operate as a first station in a first wireless network, and control a second network interface to operate as an access point in a second wireless network. The instructions are configured to cause the processors to control a bridge table that includes an entry that associates one or more network addresses of a second station with an identifier for the second network interface, wherein the second station is accessible in the second wireless network through the second network interface operating as the access point in the second wireless network. The instructions are configured to cause the processors to receive a packet for communication between the second station and a network device in the first wireless network; examine the packet to find one or more network addresses included in the packet; associate the packet with the second station by performing a lookup of the bridge table based on the one or more network addresses included in the packet; communicate information associated with the packet with the second station through the second network interface; and communicate information associated with the packet with the network device through the first network interface.

Particular implementations may include one or more of the following features. The entry associating the one or more network addresses of the second station with the identifier for the second network interface may include information associating at least one of a network layer address or a link layer address corresponding to the second station with the identifier for the second network interface, wherein the identifier for the second network interface comprises a port number.

Receiving the packet for communication may comprise receiving, at the second network interface, an address resolution protocol (ARP) request packet for communication from the second station to the network device, the ARP request packet including a network layer address and a link layer address of the second station. The link layer address of the second station in the ARP request packet may be replaced with a link layer address of the first network interface. The ARP request packet with the link layer address of the first network interface may be forwarded to the network device through the first network interface. An ARP response packet may be received, at the first network interface, from the network device, the ARP response packet including the network layer address of the second station and the link layer address of the first network interface. The ARP response packet may be associated with the second station by performing a lookup of the bridge table based on the network layer address of the second station included in the ARP response packet. The link layer address of the second station may be obtained from the bridge table. The link layer address of the first network interface in the ARP response packet may be replaced with the link layer address of the second station. The ARP response packet may be forwarded with the link layer address of the second station to the second station through the second network interface.

Forwarding the ARP request packet with the link layer address of the first network interface to the network device through the first network interface may comprise placing the ARP request packet with the link layer address of the first network interface in a frame buffer associated with the second network interface. A copy of the frame buffer may be created including the ARP request packet with the link layer address of the first network interface. The copy of the frame buffer may be associated with the first network interface. The ARP request packet with the link layer address of the first network interface may be accessed from the copy of the frame buffer by the first station. The ARP request packet with the link layer address of the first network interface may be sent by the first station to the network device through the first network interface.

The network device may be an external access point in the first network. An address resolution protocol (ARP) request packet may be received, at the first network interface, for communication from the external access point to the second station. The ARP request packet may be forwarded to the second station through the second network interface. An ARP response packet may be received, at the second network interface, from the second station, the ARP response packet including a network layer address and a link layer address of the second station. The link layer address of the second station may be replaced, in the ARP response packet, with a link layer address of the first network interface. The ARP response packet with the link layer address of the first network interface may be forwarded to the external access point through the first network interface.

Receiving the packet for communication may comprise receiving, at the first network interface, a unicast frame from the network device. One or more fields in a header portion of the unicast frame may be examined. In response to examining the one or more fields in the header portion, a determination may be made that the unicast frame is directed from the first wireless network to the second wireless network. A network layer address included in the unicast frame may be obtained, the network layer address identifying a destination of the unicast frame. The obtained network layer address may be associated with a network layer address of the second station by performing a lookup of the bridge table. A link layer address of the second station and a link layer address of the second network interface may be obtained from the bridge table. A first address field in the unicast frame may be updated with the link layer address of the second station and a second address field in the unicast frame may be updated with link layer address of the second network interface. The unicast frame may be forwarded with the updated first and second address fields to the second station through the second network interface.

The apparatus may further comprise a third network interface that is configured to operate as an access point in a third wireless network. The bridge table may be controlled to include an entry that associates one or more network addresses of a third station to an identifier for the third network interface, wherein the third station is accessible in the third wireless network through the third network interface operating as the access point in the third wireless network. A unicast frame from the second station may be received at the second network interface. Fields in a header portion of the unicast frame may be examined. In response to examining the fields in the header portion, a determination may be made that the unicast frame is directed from the second wireless network to one of the first wireless network or the third wireless network. A link layer address of a destination included in the unicast frame may be obtained. A lookup of the bridge table for an entry corresponding to the obtained link layer address may be performed. In response to determining that the obtained link layer address matches a link layer address of the third station based on the lookup of the bridge table, the unicast frame may be forwarded to the third station through the third network interface. In response to determining that an entry corresponding to the obtained link layer address is absent from the bridge table, a link layer address of the second station may be replaced, in the unicast frame, with a link layer address of the first network interface, and the unicast frame with the link layer address of the first network interface may be forwarded, through the first network interface, to an external access point in the first wireless network.

One of a broadcast frame or a multicast frame may be received from the second station. The broadcast frame or the multicast frame received from the second station may be forwarded through the first network interface, the second network interface and the third interface. One of a broadcast frame or a multicast frame from the network device in the first wireless network may be received. The broadcast frame or the multicast frame received from the network device may be forwarded through the second network interface and the third interface.

The bridge table may be controlled to include an entry that associates one or more network addresses of a third station with an internal interface of the apparatus that is indicated by a port number in the entry, wherein the third station is configured to handle network layer packets and is accessible through the internal interface. The third station may be set to a low power state in response to a determination of inactivity associated with the third station exceeding a first threshold time period. The first station and the access point may be set to a low power state in response to a determination of inactivity associated with the first network interface and the second network interface exceeding a second threshold time period. Setting the first station and the access point to the low power state may comprise periodically sending, through the first network interface, a keep alive packet to an external access point in the first wireless network using a first time interval, and periodically waking the second network interface to listen for a signal from the second station using a second time interval.

Upon an initial powering on of the apparatus, a link layer address of an external access point in the first wireless network may be obtained using the first network interface operating as the first station in the first wireless network. A link layer address of the second network interface may be determined based on the link layer address of the external access point in the first wireless network. Upon the initial powering on of the apparatus, a password of the external access point in the first wireless network may be obtained using the first network interface operating as the first station in the first wireless network. A password of the access point in the second wireless network may be determined based on the password of the external access point.

A Dynamic Host Configuration Protocol (DHCP) discovery packet from the second station may be received at the second network interface. A boot flag in the DHCP discovery packet may be set to broadcast mode. The DHCP discovery packet may be forwarded to the first wireless network through the first network interface. A DHCP response packet from a DHCP server in the first wireless network may be received at the first network interface, the DHCP response packet including an associated wireless frame header that includes a broadcast link layer address. The DHCP response packet with the associated wireless frame header may be forwarded to the second station through the second network interface.

At least one of the first wireless network or the second wireless network may be based on an Institute of Electrical and Electronics Engineers (IEEE) 802.11 communications standard.

A communication with an external access point in the first wireless network may be performed through the first network interface using a first data rate. A communication with the second station in the second wireless network may be performed through the second network interface using a second data rate that is distinct from the first data rate.

The bridge table may include an entry that associates one or more network addresses of a third station to the identifier for the second network interface. Both the second station and the third station may be accessible in the second wireless network through the second network interface operating as the access point in the second wireless network.

Implementations of the above techniques include methods, computer program products and systems for performing the above-described actions. Such a computer program product can be suitably embodied in a non-transitory machine-readable medium that stores instructions executable by one or more processors. The instructions are configured to cause the one or more processors to perform the above-described actions. One such system includes one or more bridge devices, each of which is configured to perform the above-described actions, and one or more IoT network devices.

The bridge as disclosed herein can be customized for application to IoT network devices. The bridge can be configured using similar configuration routines used to configure the IoT network devices. The bridge can be built into a device with co-located host functionality, e.g., a smart plug with a universal serial bus (USB) charger, or a built-in smart sensor. The bridge can be built at a low cost compared to other similar devices used in the industry.

The details of one or more disclosed implementations are set forth in the accompanying drawings and the description below. Other features, aspects, and advantages will become apparent from the description, the drawings and the claims.

DETAILED DESCRIPTION

Network devices in a wireless network can be connected to each other through a central access point (AP), e.g., in an infrastructure mode of the wireless network. Some of the network devices may not receive a strong signal from the AP, e.g., due to distance from the AP, or signal obstruction or interference. The signal issue may be exacerbated for IoT network devices, which can have limited signaling capabilities for their transceivers. A bridge can be positioned to provide a strong signal to the IoT network devices, and used to connect the IoT network devices to the wireless network.

In this context, a wireless network as described in the following sections refers to a wireless local area network (WLAN) or a Wi-Fi network that is based on the IEEE 802.11 family of wireless protocols. However, the systems and techniques disclosed herein can also be applied to wireless networks based on other communications standards.

An IoT network device refers to an information-sensing device, e.g., a Radio Frequency Identification (RFID) apparatus, an infrared radial sensor, a Global Positioning System (GPS) device, a laser printer or scanner, among others. The IoT network device includes a network interface and is capable of being connected to other local IoT network devices, e.g., through a WLAN, and/or to remote IoT network devices, e.g., through the Internet. By connecting various IoT network devices through a network, the devices can be managed remotely for sharing information collected by the various IoT network devices, and/or the operations of the IoT network devices can be controlled based on the shared information.

A bridge as disclosed herein is a storage/forwarding network device that is configured to connect two or more wireless networks, such as two WLANs. A bridge can split a large wireless network into multiple network segments, or interconnect two or more wireless networks into a logical group, so that all connected network devices are allowed to access a resource located in one of the constituent wireless networks. The bridge forwards frames between the multiple network segments or wireless networks by performing address translation at the data link layer. A bridge used in a WLAN or Wi-Fi network is also referred to as a Wi-Fi bridge.

Figure 1:
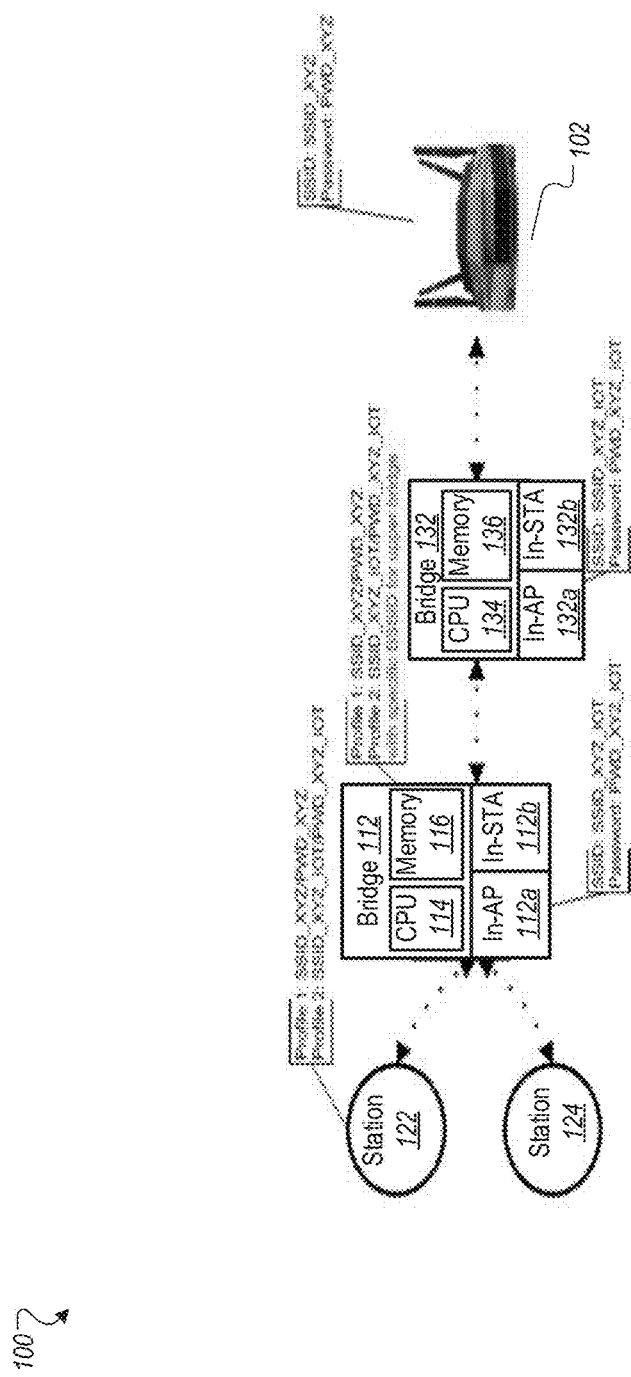
FIG. 1 illustrates an example of a system with multiple bridges for wirelessly connecting network devices, according to one or more implementations.

FIG. 1 illustrates an example of a system 100 with multiple bridges for wirelessly connecting network devices, according to one or more implementations. The system 100 includes a wireless network with an AP 102, one or more network devices, e.g., station 122 and station 124, and one or more bridge devices, e.g., bridge 112 and bridge 132.

In some implementations, the wireless network associated with the AP 102 is based on an IEEE 802.11 wireless network standard, and is operating in an infrastructure mode, e.g., various network devices in the wireless network establish wireless connections with the AP 102 and communicate with other network devices using the AP 102 as an intermediate node. The AP 102 is a network device that is configured to act as a base station for the wireless network. The AP 102 transmits to and/or receives from, other network devices in the wireless network, wireless radio frequency (RF) signals to facilitate communication with and among the network devices. In some implementations, the AP 102 is a wireless router that is configured to route data and control packets between network devices.

Network devices that send and/or receive data in the wireless network are referred to as stations in the wireless network. For example, the network devices 122 and 124 are stations in the wireless network. In some implementations, the stations 122, or 124, or both, are IoT network devices. Other stations can also be present in the wireless network, e.g., wireless mobile devices such as laptops, personal digital assistants, and smartphones, or fixed devices such as desktops and workstations that are equipped with a wireless network interface.

In some implementations, the stations 122 and 124 are outside the direct signal range of the AP 102. In such a case, the stations 122 and 124 are connected to the wireless network using one or more bridge devices, e.g., bridge 112 and bridge 132. For example, the bridge device 112 includes two network interfaces 112a and 112b. The bridge device 112 is configured with functionality to create an internal wireless network and use one network interface, e.g., network interface 112a, as an access point in the internal wireless network. The bridge device 112 is also configured with functionality to act as a station in another wireless network, e.g., the wireless network with the AP 102, using another network interface, e.g., network interface 112b. The bridge device 112 is configured to simultaneously operate one network interface (e.g., network interface 112a) as an access point in an internal wireless network generated by the bridge, and operate another network interface (e.g., network interface 112b) as a station in an external wireless network.

Although FIG. 1 shows the bridge device 112 creating one internal wireless network as described above, in some implementations a bridge can create multiple internal wireless networks. In such implementations, the bridge can be associated with different network interfaces belonging to the different internal wireless networks, configuring each network interface to act as an access point for the respective internal wireless network.

In some implementations, the functionality of the wireless network access point or the wireless network station are implemented as separate firmware packages in the hardware device 112. However, in other implementations, the functionality of the wireless network access point and the wireless network station are implemented in the same firmware package in the hardware device 112

In some implementations, the bridge device 112 is a single system-on-a-chip (SoC) with a built-in microcontroller unit, such as a central processing unit (CPU) 114, and a memory device 116. The CPU 114 can be a microprocessor or other suitable processor, and the memory device 116 can be a flash memory device, a read-only memory (ROM) device, an Electrically Erasable Programmable Read Only Memory (EEPROM) device, a hard disk, or other suitable storage device. The firmware packages corresponding to the bridge features of the hardware device, e.g., the firmware packages for the wireless network access point and the wireless network station functionalities of the bridge, include instructions that are stored in the memory device 116. The CPU 114 is configured to execute the instructions encoded by the firmware packages to provide the wireless network access point functionality and the wireless network station functionality.

In some implementations, when the instructions for the access point functionality are executed, the bridge 112 forms an internal wireless network within a limited geographic proximity of the bridge using the network interface 112a, which is configured to act as the AP for the internal wireless network. The network devices 122 and 124 are within the geographic range covered by the bridge 112, such that they can receive a strong RSSI (Received Signal Strength Indication) for the internal wireless network from the network interface 112a (e.g., over a certain acceptable signal threshold). The network devices 122 and 124 accordingly connect to the network interface 112a access point, and thereby act as stations in the internal wireless network formed by the bridge 112.

The bridge 112 is able to receive signals from the AP 102. In some implementations, when the instructions for the wireless station functionality are executed, the bridge 112 connects, through the network interface 112b, to the AP 102 as a station in the external wireless network associated with AP 102. The bridge forwards bidirectional data between the stations 122 and 124, and the AP 102 through the network interfaces 112a and 112b. In this manner, the bridge connects the stations 122 and 124 to the external wireless network associated with AP 102 as an intermediate network node.

As described above and in the rest of this disclosure, the larger wireless network in which various stations and the bridges are present is referred to as the external wireless network, and a base station in the external wireless network is referred to as an external access point (Ext-AP). For example, the wireless network in which AP 102 is the access point is the external wireless network in the system 100, and AP 102 is the Ext-AP. Local wireless networks formed by a bridge at one or more of its interfaces are referred to as internal wireless networks of the bridge. A bridge network interface that provides the access point functionality for an internal wireless network is referred to as an internal AP (In-AP) interface of the bridge. In the example above, the network interface 112a is an In-AP interface of the bridge 112. A network interface of the bridge that connects as a station to the external wireless network is referred to as an internal station (In-STA) interface of the bridge. In the example above, the network interface 112b is an In-STA interface for the bridge 112 that connects to external wireless network through the Ext-AP 102.

In some implementations, the bridge 112 is not directly connected to the Ext-AP 102. Instead, the bridge 112 connects to the Ext-AP 102 through one or more other bridges, e.g., bridge 132. This may be the case, for example, when the location of the bridge 112 is such that the RSSI from the Ext-AP 102 is below an acceptable signal threshold of the bridge 112. The upstream bridge device 132 is configured in a manner similar to the bridge 112 as described above. The bridge device 132 includes a CPU 134 and a memory device 136. The CPU 134 executes instructions encoded in the bridge firmware packages that are stored in the memory 136. By executing the instructions, the CPU 114 configures the bridge 136 to form its own internal wireless network through the network interface 132a and/or to connect as a station to the Ext-AP 102 through a second network interface 132b. Accordingly, network interface 132a is the In-AP interface for the bridge 132, while network interface 132b is the In-STA interface for the bridge 132.

The bridge 112 connects to the internal wireless network of the bridge 132 by connecting, through its In-STA interface 112a, as a station to the In-AP interface 132a of the bridge 132. In this manner, two or more bridges can be connected in a chained or stacked configuration, and thereby used to connect network devices that are at a distance from the Ext-AP 102, e.g., stations 122 and 124.

Although FIG. 1 shows only two network devices 122 and 124 in the system 100, additional network devices can also be present, including additional IoT network devices. In some implementations, different network devices are connected to different bridges. For example, one or more network devices, including IoT network devices, can be connected to the bridge 132, in addition to the network devices 122 and 124 connected to the bridge 112.

In some implementations, an identifier is associated with the each wireless network in the system 100, which is called a service set identifier (SSID) for the wireless network. The SSID for a wireless network can be an alphanumeric string. For example, the SSID for the external wireless network can be SSID_XYZ, as shown. In some implementations, a password is also associated with the each wireless network. For example, the password for the external wireless network can be PWD_XYZ, as shown. The Ext-AP 102 is configured with the SSID and the password. A network device that attempts to connect to the external wireless network by connecting to the Ext-AP 102 will have to enter the SSID and the correct password to establish a successful connection. However, in some implementations, a password may not be associated with the external wireless network. In such cases, a network device will have to enter only the SSID to connect to the Ext-AP 102.

In some implementations, an internal wireless network formed by a bridge is configured with an SSID and a password that are derived from the SSID and password of the external wireless network, respectively. For example, the SSID and password for the internal wireless network formed by the bridge 112 are configured to be SSID_XYZ_IOT and PWD_XYZ_IOT respectively, which are associated with the In-AP interface 112*a*. A network device (e.g., station 122 or 124) that attempts to connect to the In-AP interface 112*a* to access internal wireless network of the bridge will have to enter SSID_XYZ_IOT and password PWD_XYZ_IOT to establish a successful connection.

Similarly, the SSID and password for the internal wireless network formed by the bridge 132 are configured to be SSID_XYZ_IOT and PWD_XYZ_IOT respectively, which are associated with the In-AP of the interface 132*a*. A network device (e.g., In-STA interface 112*b* of the bridge 112) that attempts to connect to the In-AP interface 132*a* to access the internal wireless network of the bridge 132 will have to enter SSID_XYZ_IOT and password PWD_XYZ_IOT to establish a successful connection.

In some implementations, a password is not associated with the internal wireless network formed by the bridge 112. This may be the case, for example, when a password is not associated with the external wireless network. In such cases, a network device enters only the correct SSID to connect to the In-AP interface 112*a* or 132*a*, as applicable.

The SSID associated with a bridge can be hidden. In such a case, a network device may not be able to discover the wireless network formed by the bridge. The network device can connect to the hidden wireless network only if the device is specifically configured with the corresponding SSID and password.

A network device in the system 100 is configured with one or more profiles, where a profile specifies the SSID of a wireless network to which the network device can connect. The profile also includes a password for the wireless network, if such a password is configured at the access point of the network. In some implementations, each network device in the system 100 is configured with two or more profiles. One of the profiles specifies the SSID and password of the external wireless network. One or more of the other profiles specifies the SSID and password associated with an internal wireless network of a bridge. For example, as shown, the network device 122 is configured with two profiles, Profile 1 and Profile 2. Profile 1 specifies SSID_XYZ and PWD_XYZ, which correspond to the SSID and password respectively of the external wireless network. Profile 2 specifies SSID_XYZ_IOT and PWD_XYZ_IOT, which correspond to the SSID and password respectively of an internal wireless network formed by a bridge (e.g., bridge 112 or 132).

Each bridge in the system 100 is configured with two or more profiles. A first profile specifies the SSID and password of the external wireless network. A second profile specifies the SSID and password corresponding to an internal wireless network formed by an upstream bridge. For example, as shown, the bridge 112 is configured with two profiles, Profile 1 and Profile 2. Profile 1 specifies SSID_XYZ and PWD_XYZ, which correspond to the SSID and password respectively of the external wireless network. Profile 2 specifies SSID_XYZ_IOT and PWD_XYZ_IOT, which correspond to the SSID and password respectively of an internal wireless network formed by an upstream bridge, e.g., bridge 132. The bridge 112 uses Profile 2 to connect to the internal wireless network that is formed by the bridge 132 in a stacked configuration described above. In such a case, Profile 2 of the bridge 112 includes the datalink layer address (e.g., the medium access control (MAC) address) of the In-AP interface 132*a*, which is referred to as the basic service set identifier (BSSID) of the In-AP interface 132*a*. In some implementations, each network device and bridge in the system 100 is configured with similar profiles automatically using a smart configuration, which is described in greater detail below.

In some implementations, the internal wireless network formed by each bridge is configured with the same SSID and password. For example, the internal wireless network formed by bridge 112 at the In-AP interface 112*a* is configured with SSID_XYZ_IOT and password PWD_XYZ_IOT. Similarly, the internal wireless network formed by bridge 132 at the In-AP interface 132*a* is also configured with SSID_XYZ_IOT and password PWD_XYZ_IOT. This may be useful, for example, to allow a network device to connect to one of the several internal wireless networks. For example, the network device 122 can be mobile, and can move from the internal wireless network formed by the bridge 112 to the internal wireless network formed by the bridge 132. In such a case, network device 122 can use Profile 2 to connect to the internal wireless network formed by either bridge. However, network device 122 will also have to know the BSSID associated with the In-AP interface 112*a* or the in-AP interface 132*a*, to connect to the respective internal wireless network. In some implementations, a network device is configured to automatically connect to a bridge with a stronger RSSI (Received Signal Strength Indication).

In some implementations, one or more bridges in the system 100 also host application-level functionality. For example, the bridge 112 can be configured with functionality of a smart plug with a USB charger, or a smart sensor, or other suitable application. The functionality of the hosted application can be implemented as a firmware package stored in a memory device coupled to the bridge device, e.g., memory device 116. The device processor, e.g., CPU 114, can execute instructions encoded by the host application firmware package to provide the application features.

In this context, a smart plug refers to an electrical plug that is provided with a built-in Wi-Fi module. The smart plug can be configured through a remote application, e.g., a smartphone application, which can set threshold values for the ON/OFF current of the plug, and/or set automatic startup/shutdown of the plug remotely. A smart sensor refers to a sensor that is provided with a microprocessor, and has the capability to capture, process, and exchange information sensed by the sensor. A USB charger refers to a device that includes an USB interface configured for charging electrical appliances. The USB charger uses a data cable as a power cable and starts charging when being plugged into the devices such as a computer. The USB charger can also be equipped with a current transformer, with an output being the USB interface, and can be used for charging all electrical appliances equipped with a standard interface.

In the above manner, a bridge, e.g., bridge 112, forms an internal wireless network with a network interface acting as the access point for the internal wireless network, and connects as a station to an access point in an external wireless network. The bridge is configured with the capability to forward wireless frames that include control and data information in the directions including: (i) from a station connected to an internal wireless network to another station connected to an internal wireless network, e.g., from network device 122 to network device 124 or vice versa; (ii) from a station (e.g., network device 122 or 124) to the application hosted by the bridge; (iii) from a station (e.g., network device 122 or 124) to a station in the external wireless network (e.g., through the Ext-AP 102); (iv) from a station in the external wireless network (e.g., through the Ext-AP 102) to the application hosted by the bridge; and (v) from a station in the external wireless network (e.g., through the Ext-AP 102) to a station in an internal wireless network of the bridge. In the implementations described herein, a wireless frame refers to a WLAN frame, e.g., based on an IEEE 802.11 standard. However, in other implementations, other types of wireless frames also can be used.

To perform the forwarding function, the In-STA interface of the bridge (e.g., network interface 112b) is configured to be aware of the existence of all stations in the internal wireless network of the bridge (e.g., network devices 122 and 124), and stations in the external wireless network. This is achieved by creating entries for the network layer addresses (e.g., Internet Protocol (IP) addresses) and datalink layer addresses (e.g., MAC addresses) of stations in the internal wireless networks in the bridge table maintained by the bridge 112. Other bridges in the system 100, e.g., bridge 132, are configured with bridge tables in a similar manner.

The following sections describe IP addresses as representative examples of network layer addresses and MAC addresses as representative examples of datalink layer addresses. However, other types of network layer addresses and datalink layer addresses can also be used with the systems and techniques described below.

A station in the external wireless network needs to know the MAC address of the In-STA interface of the bridge (e.g., network interface 112b) to forward packets to a station that is connected to an internal wireless network of the bridge. In a table maintained by the access point in the external wireless network (e.g., Ext-AP 102), the IP addresses of all stations that are connected to the internal wireless network of the bridge (e.g., network devices 122 and 124) are mapped to the MAC address associated with the In-STA interface of the bridge (e.g., 112b). The forwarding function is described in greater detail in the following sections.

In some implementations, each station in the system 100 (e.g., network device 122 or 124) and each bridge (e.g., bridge 112 or 132) is configured to support one or more of IEEE 802.11a, IEEE 802.11b, IEEE 802.11g or IEEE 802.11n communication standards, among other suitable communication protocols. In some implementations, each bridge, e.g., 112 or 132, is configured to support a plurality of IoT network devices that are connected as stations to the internal wireless network formed by the bridge. For example, bridge 112 can be configured to support ten or more IoT network devices that are connected to the wireless network formed by the In-AP interface 112a.

Figure 2:
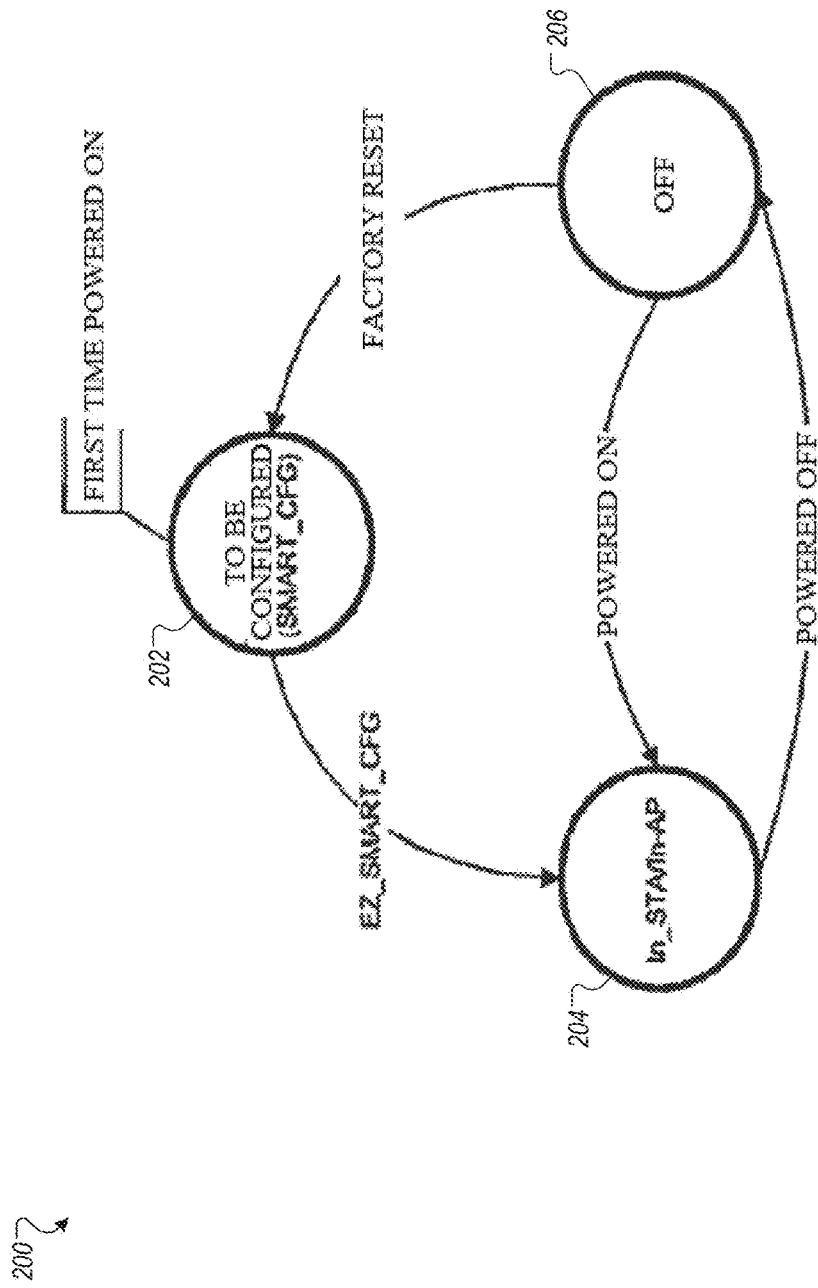
FIG. 2 illustrates an example of a state diagram for the operation of a bridge, according to one or more implementations.

FIG. 2 illustrates an example of a state diagram 200 for the operation of a bridge, according to one or more implementations. The state diagram 200 can be applied to the bridge 112 (and/or the bridge 132). Accordingly, the following section describes the state diagram 200 with respect to the bridge 112. However, the state diagram 200 is also applicable to other bridges.

When the bridge 112 is initially powered on, the bridge is in state 202, where the bridge is ready to be configured with network parameters corresponding to the internal wireless network to be formed by the bridge and profiles for other wireless networks that the bridge can connect to. In some implementations, a configuration routine is executed to set the network parameters for the bridge 112. The configuration routine is encoded as one or more instructions that are stored in a storage medium coupled to the bridge device, e.g., memory 116. A microcontroller associated with the bridge device, e.g., CPU 114, executes the one or more instructions to run the configuration routine.

The configuration routine places the bridge device in a smart configuration mode (e.g., "smart_cfg" as shown in FIG. 2) at initial power own in the state 202. The configuration routine obtains a configuration profile for the bridge 112, which includes the SSID of the Ext-AP 102, and also a password of the Ext-AP 102, if a password is present. In some implementations, SSID and password of the Ext-AP 102 are obtained by the configuration module by interacting with an external network device, e.g., a smartphone connected to the Ext-AP 102 in the external network. The configuration routine saves the configuration profile for the bridge in a storage medium coupled to the bridge device, e.g., memory 116.

The configuration routine then generates the SSID and password for an internal wireless network of the bridge. In some implementations, the configuration routine sets the access point parameters for the bridge to require a password when the In-AP is operational. As described previously, the configuration module can derive the SSID and password for the internal wireless network based on the SSID and password of the Ext-AP 102. For example, if the SSID of the Ext-AP 102 is SSID_XYZ, the SSID of the bridge is set to be SSID_XYZ_IoT. If the Ext-AP 102 has a password, e.g., PWD_XYZ, then the password of the bridge is set to be PWD_XYZ_IoT. However, if the Ext-AP 102 does not have a password, then the password of the bridge is set to be PWD_IoT. In some implementations, the configuration module can add different suffix instead of "IoT" and default password of internal wireless network, based on end user's configuration such as input from remote phone. After generating the SSID and password for the internal wireless network of the bridge, the configuration routine disables the smart configuration mode of the bridge, which then transitions to state 204.

In state 204, the configuration routine creates an internal wireless network for the bridge 112, e.g., using the access point firmware package of the bridge. The configuration routine associates the internal wireless network with a network interface of the bridge, e.g., network interface 112a. The configuration routine creates the functionality of the In-AP in the associated network interface 112a, and sets the generated SSID and password for the internal wireless network as network parameters of the In-AP interface 112a.

The configuration routine also enables the wireless station functionality for the bridge at a second network interface, e.g., In-STA interface 112b, using the wireless station firmware package of the bridge. The In-STA interface 112b scans for available wireless access points (e.g., Ext-AP 102) or bridges (e.g., bridge 132) that match the SSID specified by the profiles known to the bridge 112, e.g., SSID_XYZ or SSID_XYZ_IoT. The configuration routine selects the wireless access point or bridge with a matching SSID that returns the strongest RSSI based on the scanning.

After the In-STA interface 112b successfully establishes a connection with an external access point or another bridge, the In-AP functionality of the network interface 112a is automatically actuated in firmware, and the generated SSID and password for the internal wireless network is set for the In-AP interface. The bridge then commences normal operation, e.g., forwarding traffic between stations connected to its internal wireless network and stations in the external wireless network.

If the bridge 112 also hosts an application functionality, the configuration routine configures the network parameters for the hosted application when the In-STA interface 112b connects to the external access point or another bridge. For example, the host application may include network layer and transport layer features, such as a Transmission Control Protocol/Internet Protocol (TCP/IP) network stack. In such a case, the configuration routine activates a DHCP client in the host to acquire an IP address for the host by communicating with a DHCP server that is accessible through the external wireless network.

If the bridge 112 is powered off, then the bridge transitions to the state 206, in which the bridge is inactive. If the bridge 112 is subsequently powered on, the bridge transitions back to the state 204. Since the network parameters for bridge are already configured as described above, the configuration routine skips the initial smart configuration for the bridge. Instead, as described above, the configuration routine activates the In-STA interface 112b, which is connected to the Ext-AP 102 or bridge 132, and actives the In-AP interface 112a, after which the bridge resumes normal operation. If a host application is present, the host application is also configured as described above.

If a factory reset is performed on the bridge 112 in state 206, then the saved network parameters for the bridge are erased. Accordingly, the bridge transitions back to the state 202, in which the configuration routine determines network parameters for the bridge device using the smart configuration mode, as described previously.

Figure 3:
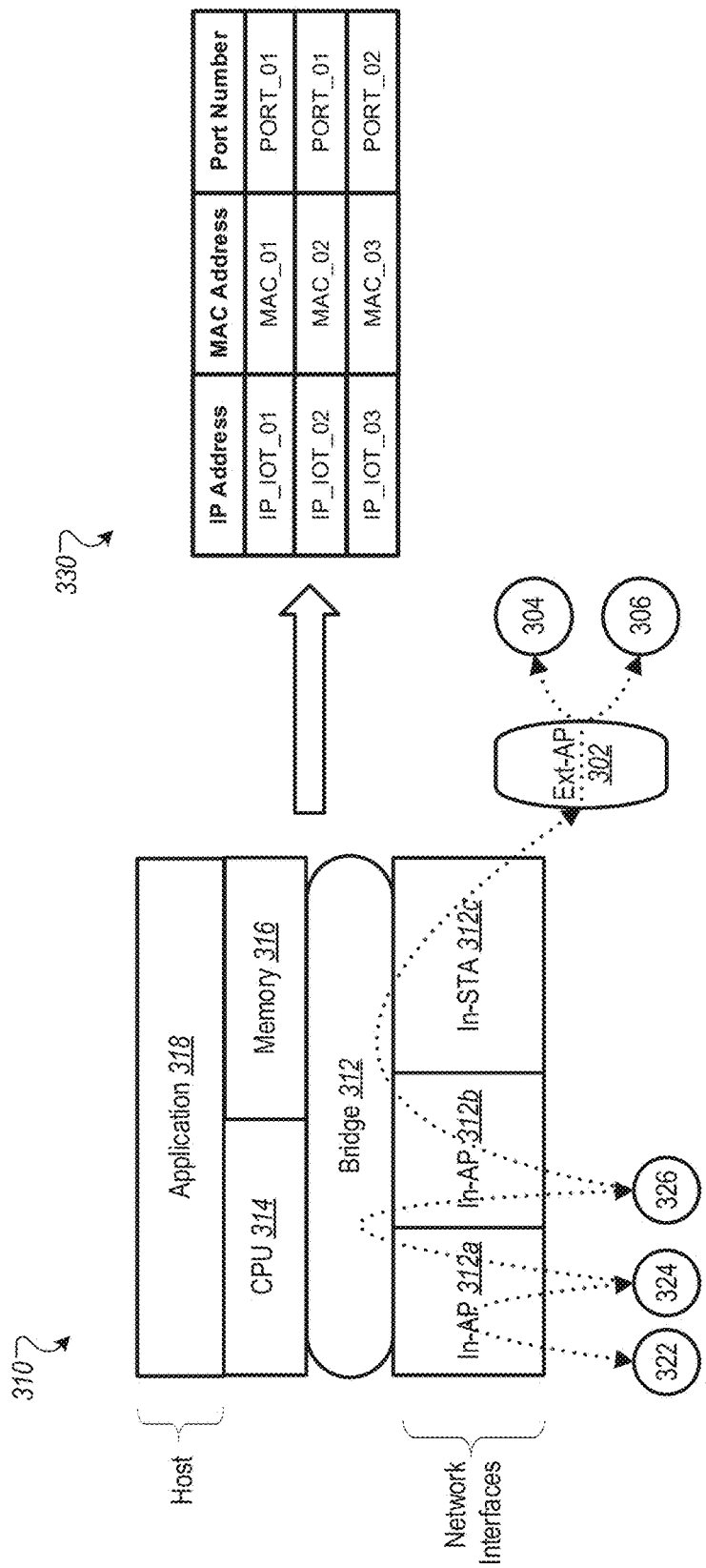
FIG. 3 illustrates a block diagram of an example of an architecture of a bridge device and a corresponding bridge table, according to one or more implementations.

FIG. 3 illustrates a block diagram of an example of an architecture of a bridge device 310 and a corresponding bridge table 330, according to one or more implementations. The bridge device 310 is a hardware device that implements a bridge 312 using network interfaces 312a, 312b and 312c. The device 310 includes a CPU 314 and a memory device 316. In some implementations, the device 310 also hosts an application 318.

The device 310 implements the bridge functionality 312 to forward wireless frames with control and data information between stations connected to internal wireless networks formed by the bridge and stations in an external wireless network, as described in greater detail below. In some implementations, features for the bridge functionality are encoded as instructions in one or more firmware packages that are stored in the memory device 316. The firmware packages include instructions for generating internal wireless networks and configuring one or more of the network interfaces 312a, 312b and 312c as access points (In-AP interfaces) for the internal wireless networks. The firmware packages also include instructions for configuring one of the network interfaces 312a, 312b or 312c as a station (In-STA interface) to connect to an external wireless network. Further, the firmware packages include instructions for generating and maintaining the bridge table 330 to forward wireless frames through the access point and station interfaces. The instructions encoded in the firmware packages are executed by the CPU 314 to configure the bridge 312, the In-AP interfaces 312a and 312b, and the In-STA interface 312c. In some implementations, the device 310 is similar to a bridge device 112 (or the bridge device 132).

The device 310 generates a first internal wireless network with the network interface 312a being configured as the corresponding access point. One or more network devices, e.g., network devices 322 and 324, are connected as stations to the first wireless network. In some implementations, network devices 322 and/or 324 are IoT network devices. The first internal wireless network operates in infrastructure mode. The stations 322 and 324 connect to the In-AP interface 312a and communicate with other stations, either in the first internal wireless network or in other networks, through the In-AP interface 312a.

The device 310 generates a second internal wireless network where the network interface 312b is configured as the corresponding access point. One or more network devices, e.g., network device 326, are connected as stations to the second wireless network. In some implementations, network device 326 is an IoT network device. The second internal wireless network operates in infrastructure mode. The station 326 connects to the In-AP interface 312b and communicates with other stations, either in the second internal wireless network or in other networks, through the In-AP interface 312b.

The device 310 configures the network interface 312c to connect as a station to external wireless network that is serviced by access point Ext-AP 302. Other network devices, e.g., network devices 304 and 306, are also connected as stations to the external wireless network. The external wireless network operates in infrastructure mode. The stations 304, 306 and in-STA interface 312c connect to the Ext-AP 302 and communicate data with other stations, either in the external wireless network or in other networks, through the Ext-AP 302. In some implementations, the Ext-AP 302 is similar to the Ext-AP 102.

In some implementations, the device 310 also hosts an application 318, which can include functionality for a smart plug or a smart sensor, among other applications. The functionality for the application 318 is specified by one or more firmware packages, which include instructions stored in the memory 316. The instructions corresponding to the firmware packages are executed by the CPU 314 to provide the features of the application 318. In some implementations, the functionality for the application 318 is preconfigured at the time of deployment of the device 310. However, in other implementations, the functionality for the application 318 can be reconfigured during use. In such a case, a user can update the firmware packages specifying the functionality of the application 318. In other implementations, the application 318 is not present in the device 310, where the device 310 performs only the functionality for the bridge 312.

The bridge 312 is configured to forward wireless frames at the datalink layer in one of several directions: (i) between stations within an internal wireless network, e.g., between stations 322 and 324 in the first internal wireless network; (ii) between stations across internal wireless networks, e.g., between station 322 or 324 in the first internal wireless network and station 326 in the second internal wireless network; (iii) between stations in an internal wireless network and stations in the external wireless network, e.g., between station 322, 324 or 326 in the first or second internal wireless network and station 304 or 306 in the external wireless network; and (iv) between a station in an internal or external wireless network and the host application 318, e.g., between station 322, 324 or 326 in the first or second internal wireless network, or station 304 or 306 in the external wireless network, and the application 318. The wireless frames include control and data information. In some implementations, the wireless frames encapsulate control or data information for the network layer, e.g., IP packets with control or data information.

The bridge 312 maintains the bridge table 330 which is used to perform the forwarding of the wireless frames. As described in greater detail below, the bridge 312 processes the frames (and the network layer packets encapsulated within the frames), by performing a table lookup of the bridge table 330 for the IP and/or MAC addresses in the frames before forwarding the frames.

In some implementations, each network interface of the device 310 is managed as a port of the bridge 312 running on the device, and is assigned a port number. For example, as shown, the In-AP interfaces 312a and 312b are assigned port numbers PORT_01 and PORT_02, respectively. The port number is used as an identifier for the respective network interface in the bridge table 330.

For each station connected to an internal wireless network of the bridge 312, the bridge includes an entry in the bridge table 330. In the entry for a station, the IP and MAC addresses of the station are associated with the port number of the respective In-AP interface to which the station is connected. Considering the example shown in FIG. 3, station 322 has IP address IP_IOT_01 and MAC address MAC_01, while station 324 has IP address IP_IOT_02 and MAC address MAC_02. The stations 322 and 324 are connected to the In-AP interface 312a. Further, station 326, which is connected to In-AP interface 312b, has IP address IP_IOT_03 and MAC address MAC_03. Accordingly, the bridge 312 maintains an entry in the bridge table 330 that associates the IP address IP_IOT_01 and MAC address MAC_01 of station 322 with the port number PORT_01 of the In-AP interface 312a The bridge 312 maintains a second entry in the bridge table 330 that associates the IP address IP_IOT_02 and MAC address MAC_02 of station 324 with the port number PORT_01 of the In-AP interface 312a. The bridge 312 maintains a third entry in the bridge table 330 that associates the IP address IP_IOT_03 and MAC address MAC_03 of station 326 with the port number PORT_02 of the In-AP interface 312b.

In some implementations, the application 318 is also assigned a port number. This is the case, for example, when the application 318 is capable of handling network layer packets, e.g., when the application 318 includes a TCP/IP protocol stack.

In some implementations, upon receiving a wireless frame for forwarding, the bridge 312 temporarily stores the frame in a receive frame buffer. The bridge 312 then processes the frame for forwarding by performing lookup of the bridge table 330, e.g., based on the destination IP address indicated in the network layer data encapsulated in the wireless frame, to determine a forwarding direction for the frame. Once the direction is determined, the bridge 312 acquires the port number of the network interface through which the frame is to be forwarded towards the intended destination. The bridge 312 makes a copy of the frame from the receive frame buffer to a transmit frame buffer. Then the bridge 312 forwards the frame towards the destination through the determined network interface.

Wireless Frame Forwarding Directions

Table I illustrates the forwarding directions in which the bridge 312 forwards wireless frames. Broadcast or multicast frames are forwarded to the internal wireless networks, the external wireless network, and the host application 318. Unicast frames are forwarded to the wireless network associated with the intended destination, or the host application 318. In greater detail, when a broadcast or multicast frame is received from a station in an internal wireless network (e.g., received at the In-AP interface 312a or 312b), the frame is forwarded to: (i) stations in the external wireless network (FWD_TO_EXTBSS), e.g., forwarded through the In-STA interface 312c to the Ext-AP 302 for sending to stations 304 and 306; (ii) the host application 318 (FWD_TO_HOST), e.g., copied to the TCP/IP protocol stack of the application 318; and (iii) other stations in the same and other internal wireless networks (if there are more than one internal wireless network) (FWD_TO_INTBSS), e.g., forwarded through the In-AP interfaces 312a and 312b to the stations 322, 324 and 326.

When a broadcast or multicast frame is received at the bridge 312 from a station in the external wireless network, e.g., received at the In-STA interface 312c from the station 304 or 306, through the Ext-AP 302, the frame is forwarded to: (i) the host application 318 (FWD_TO_HOST), e.g., copied to the TCP/IP protocol stack of the application 318; and (ii) stations in the internal wireless networks (FWD_TO_INTBSS), e.g., forwarded through the In-AP interfaces 312a and 312b to the stations 322, 324 and 326.

When a unicast frame is received from a station in an internal wireless network (e.g., received at the In-AP interface 312a or 312b), the frame is forwarded to a destination that can be one of: (i) a station in the external wireless network (FWD_TO_EXTBSS), e.g., forwarded through the In-STA interface 312c to the Ext-AP 302 for sending to station 304 or 306; (ii) the host application 318 (FWD_TO_HOST), e.g., copied to the TCP/IP protocol stack of the application 318; or (iii) a station in another internal wireless network (if there are more than one internal wireless network) (FWD_TO_another_INTBSS), e.g., forwarded through the In-AP interface 312a or 312b to the station 322, 324 or 326.

When a unicast frame is received from a station in the external wireless network, e.g., received at the In-STA interface 312c from the station 304 or 306, through the Ext-AP 302, the frame is forwarded to a destination that can be one of: (i) the host application 318 (FWD_TO_HOST), e.g., copied to the TCP/IP protocol stack of the application 318; or (ii) a station in an internal wireless network (FWD_TO_INTBSS), e.g., forwarded through the In-AP interface 312a or 312b to the station 322, 324 or 326. The following sections describe in greater detail the techniques for forwarding various kinds of wireless frames with control or data information.

TABLE I

Representative Examples of Frame Forwarding Direction by the Bridge

|  | From an internal wireless network | From the external wireless network |
|---|---|---|
| Broadcast/Multicast | FWD_TO_EXTBSS and FWD_TO_HOST and FWD_TO_INTBSS | FWD_TO_HOST and FWD_TO_INTBSS |
| Unicast | FWD_TO_EXTBSS or FWD_TO_HOST or FWD_TO_another_INTBSS | FWD_TO_HOST or FWD_TO_INTBSS |

Processing DHCP Packets

In some implementations, during a DHCP discovery process, the bridge 312 obtains information about IP addresses that are provided by a DHCP server for stations in the internal wireless networks of the bridge. For example, a station connected to an internal wireless network of the bridge 312, e.g., one of 322, 324 or 326, sends a DHCP request packet to obtain an IP address during DHCP discovery (e.g., when the station is initially powered on). The DHCP request packet is directed to a DHCP server that is reachable through the external wireless network.

The bridge 312 receives the DHCP request packet from the source station at In-AP interface 312a or 312b. The bridge sets a bootstrap protocol flag in the DHCP request packet to broadcast mode (e.g., sets the flag to bit value '1'), and forwards a wireless frame encapsulating the packet to the DHCP server by sending the packet to the Ext-AP 302 from the In-STA interface 312c. Due to the bootstrap protocol flag being set to broadcast mode in the DHCP request packet, the DHCP server responds by including a broadcast MAC address in the header of the wireless frame that encapsulates the DHCP response packet.

The wireless frame with the broadcast MAC address in the header is received at the In-STA interface 312c (and also at other stations in the external wireless network, e.g., 304 or 306). The bridge also forwards the DHCP response packet to (i) the host application 318 (FWD_TO_HOST), e.g., copied to the TCP/IP protocol stack of the application 318; and (ii) stations in the internal wireless networks (FWD_TO_INTBSS), e.g., forwarded through the In-AP interfaces 312a and 312b to the stations 322, 324 and 326.

Proxy ARP Implementation

In some implementations, the bridge 312 implements a proxy ARP technique using the bridge table 330. When an ARP request or response packet is sent from or to a station connected to an internal network of the bridge (e.g., station 322, 324 or 326), the bridge 312 accesses the ARP request or response packet that is encapsulated in a wireless frame, and manipulates the MAC addresses indicated in the packet. For example, when responding to ARP requests sent to the stations 322, 324 and 326 from the Ext-AP 302, bridge 312 maps the IP addresses of the stations 322, 324 and 326 to the MAC address of the In-STA interface 312c, as described by the representative examples below.

In one case, a station in an internal network, e.g., station 322, sends an ARP request packet to obtain the MAC address of the Ext-AP 302, which is unknown to the station. The ARP request packet, which includes the MAC and IP addresses of the station and the IP address of the Ext-AP 302 as shown below, is sent by the station 322 in the first internal wireless network of the bridge 312.

| Sending End MAC | Sending End IP | Target MAC | Target IP |
| --- | --- | --- | --- |
| Station 322 | Station 322 | 00:00:00 | Ext-AP |

The broadcast ARP request is received by the bridge 312 at the In-AP interface 312a. The bridge 312 replaces the MAC address of the station 322 in the "Sending End MAC" field of the ARP request packet with the MAC address of the In-STA interface 312c, and sends the modified ARP request packet to the external wireless network through the In-STA interface 312c.

| Sending End MAC | Sending End IP | Target MAC | Target IP |
| --- | --- | --- | --- |
| In-STA 312c | Station 322 | 00:00:00 | Ext-AP |

The Ext-AP 302 receives the ARP request packet and sends a unicast ARP response packet, which includes the IP address of the Ext-AP 302, back to the In-STA interface 312c.

| Sending End MAC | Sending End IP | Target MAC | Target IP |
| --- | --- | --- | --- |
| Ext-AP | Ext-AP | In-STA312c | Station 322 |

The bridge 312 obtains the MAC address of the originating station, e.g., 322, by performing a table lookup of the bridge table 330 based on the IP address of the station that is indicated in the "Target IP" field of the ARP response packet. The bridge 312 updates the "Target MAC" field in the ARP response packet with the MAC address of the originating station, and forwards the ARP response to the station through the In-AP interface of the bridge to which the station is connected, e.g., 312a. The bridge determines the associated In-AP interface by obtaining the port number associated with the IP address during the bridge table lookup.

| Sending End MAC | Sending End IP | Target MAC | Target IP |
| --- | --- | --- | --- |
| Ext-AP | Ext-AP | Station 322 | Station 322 |

In one case, a station in an internal network, e.g., station 322, sends an ARP request packet to obtain the MAC address of a station in the external network, e.g., 304, which is unknown to the station. The ARP request packet, which includes the MAC and IP addresses of the station 322 and the IP address of the station 304 as shown below, is sent by the station 322 in the first internal wireless network of the bridge 312.

| Sending End MAC | Sending End IP | Target MAC | Target IP |
| --- | --- | --- | --- |
| Station 322 | Station 322 | 00:00:00 | Station 304 |

The broadcast ARP request is received by the bridge 312 at the In-AP interface 312a. The bridge 312 replaces the MAC address of the station 322 in the "Sending End MAC" field of the ARP request packet with the MAC address of the In-STA interface 312c, and sends the modified ARP request packet to the external wireless network through the In-STA interface 312c.

| Sending End MAC | Sending End IP | Target MAC | Target IP |
| --- | --- | --- | --- |
| In-STA 312c | Station 322 | 00: 00: 00 | Station 304 |

The station 304 in the external network receives the ARP request packet and sends a unicast ARP response packet, which includes the IP and MAC addresses of the station, back to the In-STA interface 312c.

| Sending End MAC | Sending End IP | Target MAC | Target IP |
|---|---|---|---|
| Station 304 | Station 304 | In-STA312c | Station 322 |

The bridge 312 obtains the MAC address of the originating station, e.g., station 322, and port number of the associated network interface by performing a table lookup of the bridge table 330 based on the IP address of the station that is indicated in the "Target IP" field of the ARP response packet. The bridge 312 updates the "Target MAC" field in the ARP response packet with the MAC address of the originating station, and forwards the ARP response to the station through the In-AP interface of the bridge to which the station is connected, e.g., In-AP interface 312a.

| Sending End MAC | Sending End IP | Target MAC | Target IP |
|---|---|---|---|
| Station 304 | Station 304 | Station 322 | Station 322 |

In one case, the Ext-AP 302 sends an ARP request packet to obtain the MAC address of a station connected to the bridge, e.g., station 322, which is unknown to the Ext-AP 302. The ARP request packet, which includes the MAC and IP addresses of Ext-AP 302 and the IP address of the station 322 as shown below, is broadcast by the Ext-AP 302 in the external wireless network.

| Sending End MAC | Sending End IP | Target MAC | Target IP |
|---|---|---|---|
| Ext-AP | Ext-AP | 00:00:00 | Station 322 |

The broadcast ARP request is received by the bridge 312 at the In-STA interface 312c. The bridge 312 forwards the packet without modification to the station through the In-AP interface that is connected to the station, e.g., In-AP interface 312a.

The station sends an ARP response packet that is unicast to the Ext-AP 302. The ARP response packet is unicast in the internal wireless network of the station and is received at the respective In-AP interface of the bridge, e.g., In-AP interface 312a.

| Sending End MAC | Sending End IP | Target MAC | Target IP |
|---|---|---|---|
| Station 322 | Station 322 | Ext-AP | Ext-AP |

The bridge 312 replaces the MAC address of the station 322 in the "Sending End MAC" field of the ARP response packet with the MAC address of the In-STA interface 312c, and sends the modified ARP response packet to the Ext-AP 302 through the In-STA interface 312c.

| Sending End MAC | Sending End IP | Target MAC | Target IP |
|---|---|---|---|
| In-STA 312c | Station 322 | Ext-AP | Ext-AP |

In the above manner, the bridge 312 implements a proxy ARP engine to handle ARP request and response packets between stations connected to its internal wireless networks, and the Ext-AP 302 and stations in the external wireless network. As exemplified above, the Ext-AP 302 and stations in the external wireless network know the MAC address of the In-STA interface 312c, but not the respective MAC addresses of the stations in the internal wireless networks of the bridge, e.g., station 322, 324 or 326. Accordingly, all frames from network devices in the external wireless network that are destined for stations in the internal networks of the bridge are sent to the In-STA interface 312c. For unicast frames, the bridge 312 needs to know the MAC address of the station in an internal network that is the actual destination for the frames. The bridge makes the determination by performing table lookup of the bridge table 330 based on the target IP address indicated in the network layer data encapsulated in the frame. If an entry is found in the bridge table with an IP address that matches the target IP address in the frame, the corresponding MAC address in the entry is determined to be the MAC address of the target station. The network interface through which the station can be reached is determined based on the port number associated with the matching entry in the bridge table.

Processing IPv6 Packets

In some implementations, the bridge 312 is configured to process IPv6 packets that are encapsulated in wireless frames. In such cases, the entries in the bridge table 330 can include IPv6 address, in addition to or in replacement of IP version 4 (IPv4) addresses. For example, consider a situation in which network device 322 associates with an In-AP interface 312a as a station in the corresponding first internal wireless network. Station 322 multicasts an IPv6 Neighbor Solicitation (NS) packet directed towards the Ext-AP 302.

| Source Address | Destination Address | Target Address | Datalink Layer Address |
|---|---|---|---|
| Station 322 IPv6 address | Ext-AP solicited-node multicast address | Ext-AP IPv6 address | Station 322 MAC address |

The NS packet is received by the bridge 312 at the In-AP interface 312a to which station 322 is connected. The bridge replaces the datalink layer address with the MAC address of the In-STA interface 312c, and multicasts the NS packet in the external wireless network through the In-STA interface 312c.

| Source Address | Destination Address | Target Address | Datalink Layer Address |
|---|---|---|---|
| Station 322 IPv6 address | Ext-AP solicited-node multicast address | Ext-AP IPv6 address | In-STA312c MAC address |

The Ext-AP 302 unicasts back an IPv6 Neighbor Acknowledgement (NA) response packet to the In-STA interface 312c. The bridge 312 forwards the NA packet to originating station 322 without any modifications. To perform the forwarding, the bridge obtains the MAC address and the port number for station 322 from the bridge table 330, based on the station's IPv6 address indicated in the destination field of the NA packet.

| Source Address | Destination Address | Target Address | Datalink Layer Address |
|---|---|---|---|
| Ext-AP IPv6 address | Station 322 IPv6 address | Ext-AP IPv6 address | Ext-AP MAC address |

In another example, consider a case in which the Ext-AP 302 sends a NS request packet that is directed towards the station 322. The Ext-AP 302 multicasts the NS request, which is received by the bridge 312 at the In-STA interface 312*c*. The bridge forwards the NS packet without modification to the station through the In-AP interface that is connected to the station, e.g., network interface 312*a*.

| Source Address | Destination Address | Target Address | Datalink Layer Address |
|---|---|---|---|
| Ext-AP IPv6 address | Station 322 solicited-node multicast-address | Station 322 IPv6 address | Ext-AP MAC address |

Station 322 sends a NA response packet, which is a unicast packet that is directed towards to the Ext-AP 302. The NA response packet is received by the bridge 312 at the In-AP interface 312*a*.

| Source Address | Destination Address | Target Address | Datalink Layer Address |
|---|---|---|---|
| Station 322 IPv6 address | Ext-AP IPv6 address | Station 322 IPv6 address | Station 322 MAC address |

The bridge 312 updates the datalink layer address field with the MAC address of the In-STA interface 312*c*, and forwards the packet to the Ext-AP 302 through the In-STA interface 312*c*.

| Source Address | Destination Address | Target Address | Datalink Layer Address |
|---|---|---|---|
| Station 322 IPv6 address | Ext-AP IPv6 address | Station 322 IPv6 address | In-STA 312c MAC address |

In some implementations, the bridge table 330 is implemented as an array in the memory 316. However, other data structures can also be used, e.g., linked lists. The bridge table includes entries of each station linked to an In-AP interface of the bridge, and an entry for the port associated with the host application 318 (when an application is hosted by the device 318). The bridge creates and populates entries in the bridge table based on the IP addresses and MAC addresses that are learned from the ARP request and response packets.

In some implementations, entries in the bridge table 330 are updated. For example, when a station roams from the first internal wireless network to the second internal wireless network, the port number in the bridge table entry for the station has to be changed from In-AP interface 312*a* to the In-AP interface 312*b* of the second wireless network. If the station does not send a new DHCP request for a new IP address, then the bridge 312 looks up the entry for the station using the existing IP address and changes the port number in the entry from PORT_01 (corresponding to the In-AP interface 312*a*) to PORT_02 (corresponding to the In-AP interface 312*b*).

In some implementations, entries are removed from the bridge table 330. For example, when a station is de-authorized by the In-AP interface to which the station is connected, or the wireless connection between the station and the In-AP interface ages out, the bridge 312 is notified. The bridge then labels the corresponding entry in the bridge table as invalid. Subsequently, when a new entry is added, the invalid entry may be removed from the bridge table and thereby memory can be reused.

In some implementations, the bridge uses a data queue, e.g., created in the firmware in the memory 316. All transmit wireless frames from the port corresponding to the host application 318 and receive wireless frames from other ports (e.g., corresponding to In-AP interfaces 312*a* and 312*b*, and In-STA interface 312*c*) are stored in the bridge data queue. The bridge 312 obtains a receive frame buffer from bridge data queue and parses the frame payload and the frame header. For the broadcast and multicast frame, the bridge 312 obtains the forward direction through the source port as described previously. For unicast frame, the bridge 312 determine the forward output port and destination through the bridge table look up as detailed in below. Once the forward output port and destination are determined, the bridge allocates one or more transmit frame buffers, clones the original receive frame buffer to the transmit frame buffers and then forwards the frame towards the destination.

Unicast Frame Handling

In some implementations, when a wireless frame as unicast data is received at a network interface of the device 310, the bridge 312 handles the frame by performing a table lookup on the bridge table 330, as described below. When a frame is sent from a station in the external wireless network, the "FromDs" bit field in the header of the wireless frame is set to bit value"1". The bridge 312 uses the destination IP address indicated in the network layer payload of the frame as an index for searching entries in the bridge table 330. If an entry in the table is found that matches the destination IP address from the frame, the bridge 312 obtains the corresponding MAC address and the port number from the entry. Then the bridge 312 updates the destination MAC address in the frame with the MAC address obtained from the entry, and forwards the unicast frame to the destination station through the In-AP interface corresponding to the obtained port number.

In one case, the frame is forwarded from a station in the external wireless network (e.g., station 304 or 306) to a station in the internal wireless network (e.g., station 322, 324 or 326). The frame received at the bridge 312 includes the MAC address of the In-STA interface 312*c* in the "Target MAC Address" field and the MAC address of the originating station in the "Source MAC Address" field. The bridge 312 performs a lookup of the bridge table 330 based on the IP address of the destination and obtains the corresponding destination MAC address and the associated port number. The bridge 312 updates the "Target MAC Address" field with the MAC address from the table entry.

| Target MAC Address | Source MAC Address | BSSID Address | FromDS | ToDS |
|---|---|---|---|---|
| MAC of found entry | Source MAC | BSSID address | 1 | 0 |

When a unicast wireless frame is sent from a station in an internal wireless network of the bridge 312, the "ToDs" bit field in the header of the wireless frame is set to bit value '1'. The bridge uses the destination MAC address specified in the frame header as an index for searching entries in the bridge table 330.

If no matching entry is found in the bridge table, this indicates that the destination MAC address is associated with a station in the external wireless network. Accordingly, the bridge 312 update the source MAC address in the frame with the In-STA's MAC address and forwards the unicast frame through the In-STA interface 312c to the Ext-AP 302, which will route the frame to the appropriate destination station. In one case, the frame is forwarded from a station in an internal wireless network (e.g., station 322, 324 or 326) to a station in the external wireless network (e.g., station 304 or 306). The bridge 312 replaces "Source MAC Address" field with the MAC address of the In-STA interface 312c, as show below, and forwards the frame to the Ext-AP 302 through the In-STA interface 312c.

| Target MAC Address | Source MAC Address | BSSID Address | FromDS | ToDS |
|---|---|---|---|---|
| Target MAC | In-STA MAC | BSSID address | 0 | 1 |

On the other hand, if a matching entry is found in the bridge table 330 and is associated with the port number of the host application 318, the bridge 312 copies the unicast frame to the protocol stack for the host application 318. However if a matching entry is found in the bridge table 330 and is associated with the port number of an internal wireless network, then the bridge 312 forwards the unicast frame through the In-AP interface corresponding to the port number obtained from the matching table entry.

In one case, the frame is forwarded from a station in an internal wireless network (e.g., network interface 322) to another station in an internal wireless network, which can be the same internal network or a different internal network (e.g., network interface 324 or 326). The bridge 312 updates the "BSSID Address" field with the MAC address of the In-AP interface that is associated to the port number obtained from the entry.

| Target MAC Address | Source MAC Address | BSSID Address | FromDS | ToDS |
|---|---|---|---|---|
| Target MAC | Source MAC | BSSID Address | 0 | 1 |

Power Saving Techniques

In some implementations, the device 310 implements power saving features. The CPU 314 executes one or more instructions stored in the memory 316 (e.g., instructions encoded in the firmware packages for the bridge 312 and the application 318) to implement power saving techniques for the bridge 312 and the host application 318. Power saving is performed separately for the host application 318 and the bridge 312. The CPU 314 executes instructions to place the host application 318 in a sleep state when the host application is inactive, e.g., there is no traffic for the host for a time period that exceeds a predetermined inactivity threshold time for the host application. The instructions are also configured to wake up the host application when there is traffic exchanged for the host. The inactivity threshold for the host application is set to a suitable value, e.g., 500 milli-seconds (ms). In some implementations, the host application is programmed with a default value for the inactivity threshold. In other implementations, the inactivity threshold for the host application can be configured during execution of the application instructions, e.g., set by a user of the device 310.

The bridge 312 is placed in a power save mode when there is no activity on the In-AP interfaces 312a and 312b, and the In-STA interface 312c, for a time period that exceeds a predetermined inactivity threshold time for the bridge. The inactivity threshold for the bridge is set to a suitable value, e.g., 200 ms. In some implementations, the bridge firmware is programmed with a default value for the inactivity threshold. In other implementations, the inactivity threshold for the bridge can be configured during execution of the bridge firmware, e.g., set by a user of the device 310.

In some implementations, the inactivity threshold time for the host application 318 is different from the inactivity threshold time for the bridge 312. However, in other implementations, the inactivity threshold times for the host application 318 and the bridge 312 are the same.

When the bridge 312 is in the power save mode, any existing connection between the In-STA interface 312c and the Ext-AP 302 is maintained. To do so, the CPU 314 wakes up the In-STA interface 312c periodically, even if there is no traffic for In-STA, and sends a "keep alive" packet to the Ext-AP 302. The time interval at which keep alive packets are sent is set to a suitable value. For example, the interval is set to 30 ms in some implementations. In some implementations, the bridge firmware is programmed with a default value for the keep alive packet interval. In other implementations, the keep alive packet interval can be configured during execution of the bridge firmware, e.g., set by a user of the device 310.

In some implementations, when the In-STA interface 312c wakes up to send a keep alive packet, the In-STA interface 312c is kept awake for an awake time period, so that any probe request sent by the Ext-AP 302 is not missed. The awake time period is set to a suitable value, e.g., 2 ms. In some implementations, the bridge firmware is programmed with a default value for the awake time period. In other implementations, the awake time period can be configured during execution of the bridge firmware, e.g., set by a user of the device 310.

When the bridge 312 is in the power save mode, existing connections between the In-AP interfaces 312a and 312b and stations in their respective internal wireless networks are also maintained. For example, a connection between In-AP interface 312a and station 322, and a connection between In-AP interface 312b and station 326 are both maintained. To maintain the connections, the CPU wakes up each In-AP interface periodically to listen for any frames being sent by one or more stations connected to the interface. In some implementations, the listen interval is based on best estimation. In other implementations, the listen interval is set to a suitable default value, e.g., every 30 ms. In some implementations, the bridge firmware is programmed with a default value for the listen interval. In other implementations, the listen interval can be configured during execution of the bridge firmware, e.g., set by a user of the device 310. In some implementations, the time period for which an In-AP interface remains awake to listen for frames from stations is set to a minimum value, e.g., the awake time period described above.

In the manner disclosed above, the bridge can be configured for low power consumption, including a sleep mode for power saving as well as reducing the power consumption during normal operation, which is useful for IoT network devices where batteries are used as the power supply.

Figure 4:
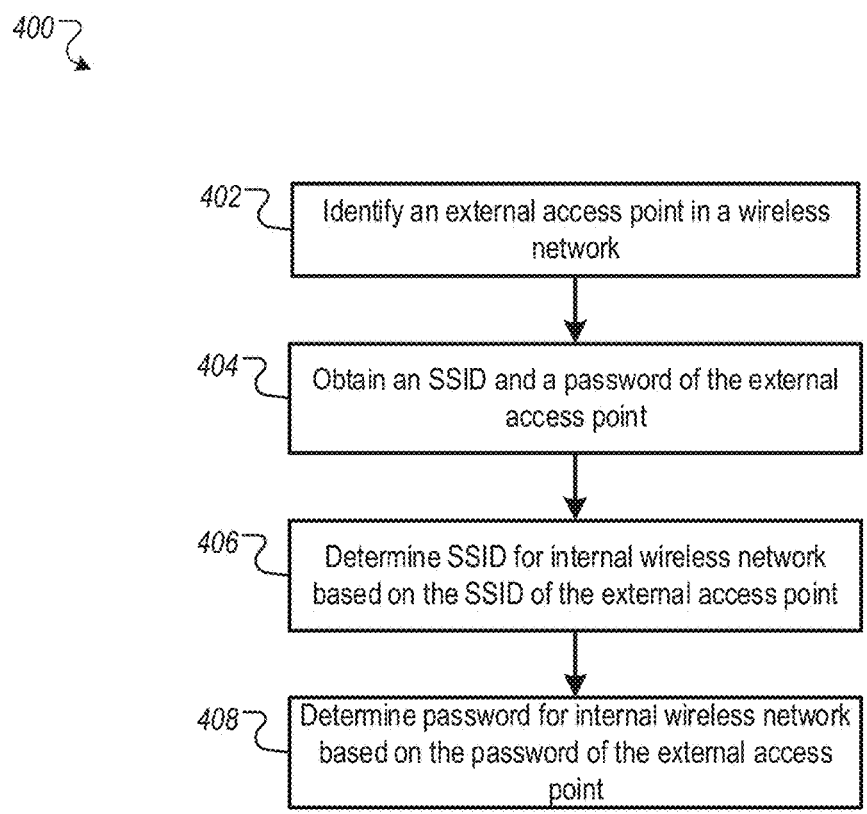
FIG. 4 illustrates an example of a process for setting network parameters for a bridge, according to one or more implementations.

FIG. 4 illustrates an example of a process 400 for setting network parameters for a bridge, according to one or more implementations. The process 400 can be performed by the bridge 112 (or the bridge 132 or 312). Accordingly, the following sections describe the process 400 with respect to the bridge 112. However, the process 400 also may be performed by other suitable devices.

In some implementations, the process 400 is performed by one or more processors associated with the bridge device, which execute instructions stored in memory coupled to the bridge device. For example, the CPU 114 performs the process 400 by executing instructions stored in the memory 116 to run the smart configuration for the bridge 112.

At 402, an external access point in a wireless network is identified. For example, when the bridge 112 is powered on and placed in a smart configuration mode in state 202, the configuration routine executed by the CPU 114 scans the neighborhood of the bridge device for presence of a wireless network and an associated access point. By doing so, the configuration routine detects the Ext-AP 102 present in the external wireless network.

At 404, an SSID and a password of the external access point are obtained. For example, the configuration routine executed for the bridge 112 obtains the SSID of the Ext-AP 102, and also a password of the Ext-AP 102, if a password is present. In some implementations, SSID and password of the Ext-AP 102 are obtained by the configuration module by interacting with an external network device, e.g., a smartphone connected to the Ext-AP 102 in the external network.

At 406, an SSID for an internal wireless network is determined based on the SSID of the external access point. For example, the configuration routine for the bridge 112 derives the SSID for an internal wireless network generated by the bridge 112 based on the SSID of the Ext-AP 102. For example, if the SSID of the Ext-AP 102 is SSID_XYZ, the SSID of the bridge is set to be SSID_XYZ_IoT. The suffix "IOT" could be a predefined string, or some other suitable string, configured by a user application.

At 408, a password for an internal wireless network is determined based on the password of the external access point. For example, if the Ext-AP 102 has a password, the configuration routine for the bridge 112 derives the password for the internal wireless network generated by the bridge 112 based on the password of the Ext-AP 102. If the password of the Ext-AP 102 is PWD_XYZ, then the password of the bridge is set to be PWD_XYZ_IoT. The suffix "IOT" could be a predefined string, or some other suitable string, configured by a user application. However, if the Ext-AP 102 does not have a password, then the configuration routine sets password of the bridge to a different value, e.g., PWD_IoT.

Figure 5A:
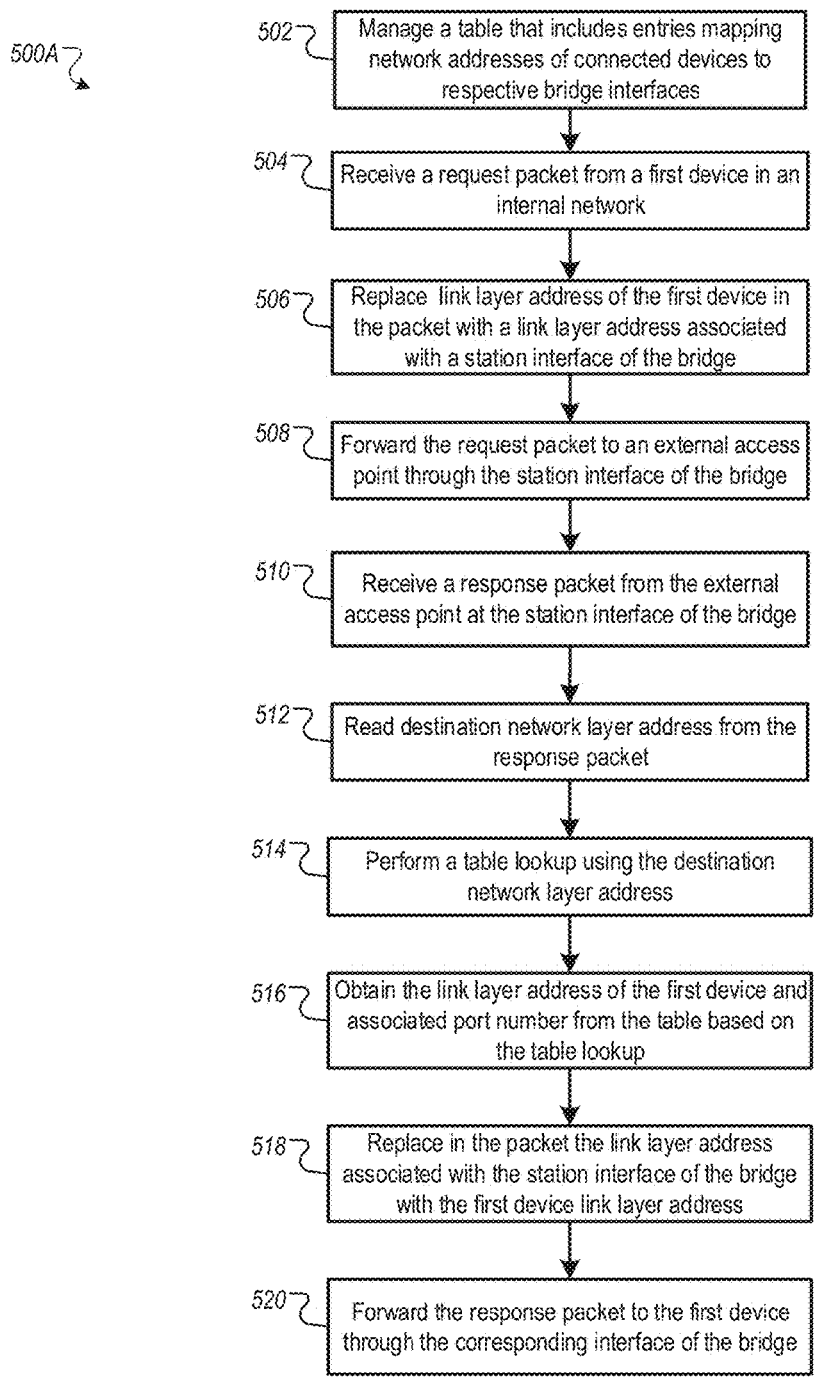
FIGS. 5A and 5B illustrate examples of processes for handling wireless frames with control information by a bridge, according to one or more implementations.
Figure 5B:
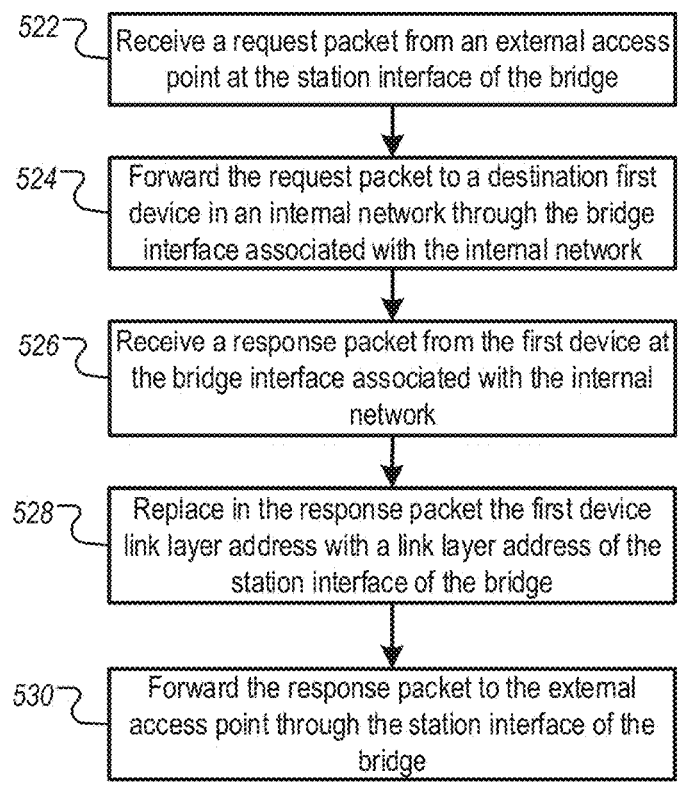

FIGS. 5A and 5B illustrate examples of processes 500A and 500B respectively for handling wireless frames with control information by a bridge, according to one or more implementations. The processes 500A and 500B can be performed by the bridge 312, e.g., to handle ARP request and response packets or IPv6 NS or NA packets. Accordingly, the following sections describe the processes 500A and 500B with respect to the bridge 312. However, the processes 500A and 500B also may be performed by other suitable devices.

In some implementations, the processes 500A and 500B are performed by one or more processors associated with the bridge, which execute instructions stored in memory coupled to the bridge device. For example, the CPU 314 performs the processes 500A and 500B by executing instructions corresponding to the firmware packages for the bridge 312. As noted previously, the bridge firmware packages are stored in the memory 116, in some implementations.

The process 500A provides an example of the bridge handling a wireless frame that includes a request packet sent by a station in an internal wireless network of the bridge, e.g., station 322, and handling a wireless frame with a corresponding response packet sent by a device in the external wireless network, e.g., Ext-AP 302 or one of the stations 304 or 306. At 502, a table that includes entries mapping network addresses of connected devices to respective bridge interfaces is managed. For example, the bridge 312 manages the bridge table 330, which maps the IP and MAC addresses of stations in the internal wireless networks of the bridge 312 (e.g., stations 322, 324 and 326) to port numbers of the corresponding In-AP interfaces (e.g., In-AP interfaces 312a and 312b).

At 504, a request packet is received from a first device in an internal network. For example, the station 322 in the first internal network of the bridge 312 sends wireless frame with an ARP request packet, which is received by the bridge at the In-AP interface 312a.

At 506, a link layer address of the first device in the packet is replaced with a link layer address associated with a station interface of the bridge. For example, the bridge 312 replaces the MAC address of the station 322 in the "Sending End MAC" field of the ARP request packet with the MAC address of the In-STA interface 312c.

At 508, the request packet is forwarded to an external access point through the station interface of the bridge. For example, the bridge 312 forwards the wireless frame with the ARP request packet from the station 322 to the Ext-AP 302 by sending the wireless frame to the external wireless network through the In-STA interface 312c.

At 510, a response packet is received from the external access point at the station interface of the bridge. For example, the bridge 312 receives, at the In-STA interface 312c, a wireless frame with an ARP response packet that is unicast by the Ext-AP 302 to respond to the ARP request packet sent by the station 322. The ARP response packet includes the MAC address of the In-STA interface 312c in the "Target MAC" field, but the IP address of the station 322 in the "Target IP" field.

At 512, a destination network layer address is read from the response packet. For example, the bridge 312 reads, from the "Target IP" field of the ARP response packet, the IP address of the destination for the ARP response packet, which corresponds to the IP address of the station 322.

At 514, a table lookup is performed using the destination network layer address. For example, the bridge 312 performs a lookup of the bridge table 330, using as index the IP address of the destination read from the "Target IP" field of the ARP response packet.

At 516, the link layer address of the first device and the associated port number are obtained from the table based on the table lookup. For example, based on the table lookup at 514, the bridge 312 finds an entry in the bridge table 330 corresponding to the station 322, with an IP address that matches the IP address used as the index in the table lookup. The bridge 312 reads, from the matching table entry, the MAC address of the device and the port number corresponding to the In-AP interface at which the device is connected.

At 518, the link layer address associated with the station interface of the bridge in the packet is replaced with the first device link layer address. For example, the bridge 312 replaces, in the "Target MAC" field of the ARP response packet, the MAC address of the In-STA interface 312c with the MAC address of the station 322 read from the matching bridge table entry.

At 520, the response packet is forwarded to the first device through the corresponding interface of the bridge. For example, the bridge 312 forwards the wireless frame with the ARP response packet, with the "Target MAC" field updated at 518, to the station 322 through the In-AP interface 312a. The bridge determines the In-AP interface 312a as associated with the destination by obtaining the port number from the matching entry in the bridge table at 516.

The process 500B provides an example of handling a wireless frame that includes a request packet sent by a device in the external wireless network, e.g., Ext-AP 302 or one of the stations 304 or 306, and handling a wireless frame with a corresponding response packet sent by a station in an internal wireless network of the bridge, e.g., station 322. At 522, a request packet from an external access point is received at the station interface of the bridge. For example, the Ext-AP 302 broadcasts a wireless frame with an ARP request packet to obtain the MAC address of a station connected to the bridge, e.g., station 322, which is unknown to the Ext-AP 302. The wireless frame with the ARP request packet, which includes the MAC and IP addresses of Ext-AP 302 and the IP address of the station 322, is received by the bridge 312 at the In-STA interface 312c.

At 524, the request packet is forwarded to a destination first device in an internal network through the bridge interface associated with the internal network. For example, the bridge 312 forwards the wireless frame with the ARP request packet, which is received from the Ext-AP 302 at 522, to the station 322 through the In-AP interface 312a.

At 526, a response packet from the first device is received at the bridge interface associated with the internal network. For example, station 322 sends a wireless frame with an ARP response packet to respond to the ARP request packet from the Ext-AP 302. The wireless frame with the ARP response packet is sent in the first internal wireless network of the bridge 312 and is received at the corresponding In-AP interface 312a of the bridge.

At 528, the first device link layer address in the response packet is replaced with a link layer address of the station interface of the bridge. For example, the bridge 312 replaces the MAC address of the station 322 specified in the "Sending End MAC" field of the ARP response packet with the MAC address of the In-STA interface 312c.

At 530, the response packet is forwarded to the external access point through the station interface of the bridge. For example, the bridge 312 forwards the wireless frame with the ARP response packet received from the station 322, modified at 528, to the Ext-AP 302 through the In-STA interface 312c.

Figure 6A:
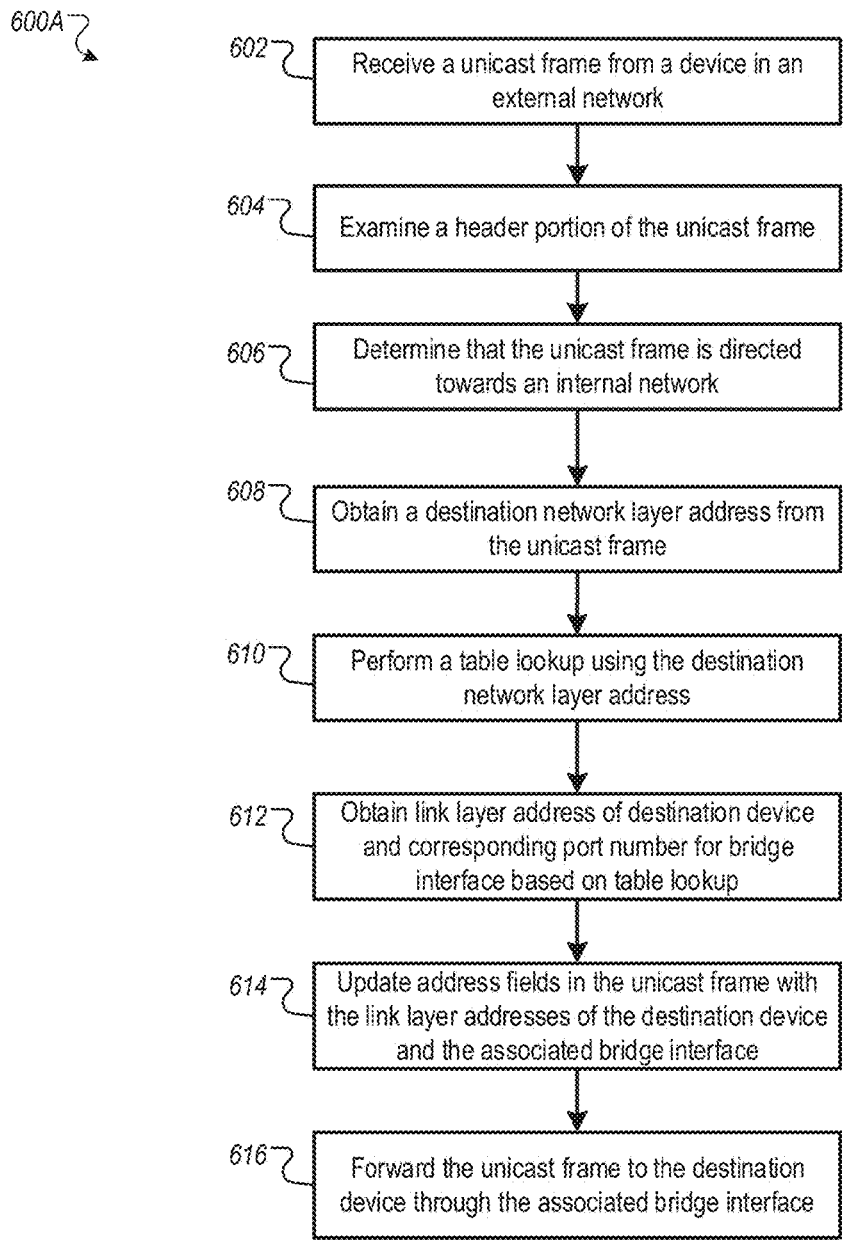
FIGS. 6A and 6B illustrate examples of processes for handling wireless frames with unicast data by a bridge, according to one or more implementations.
Figure 6B:
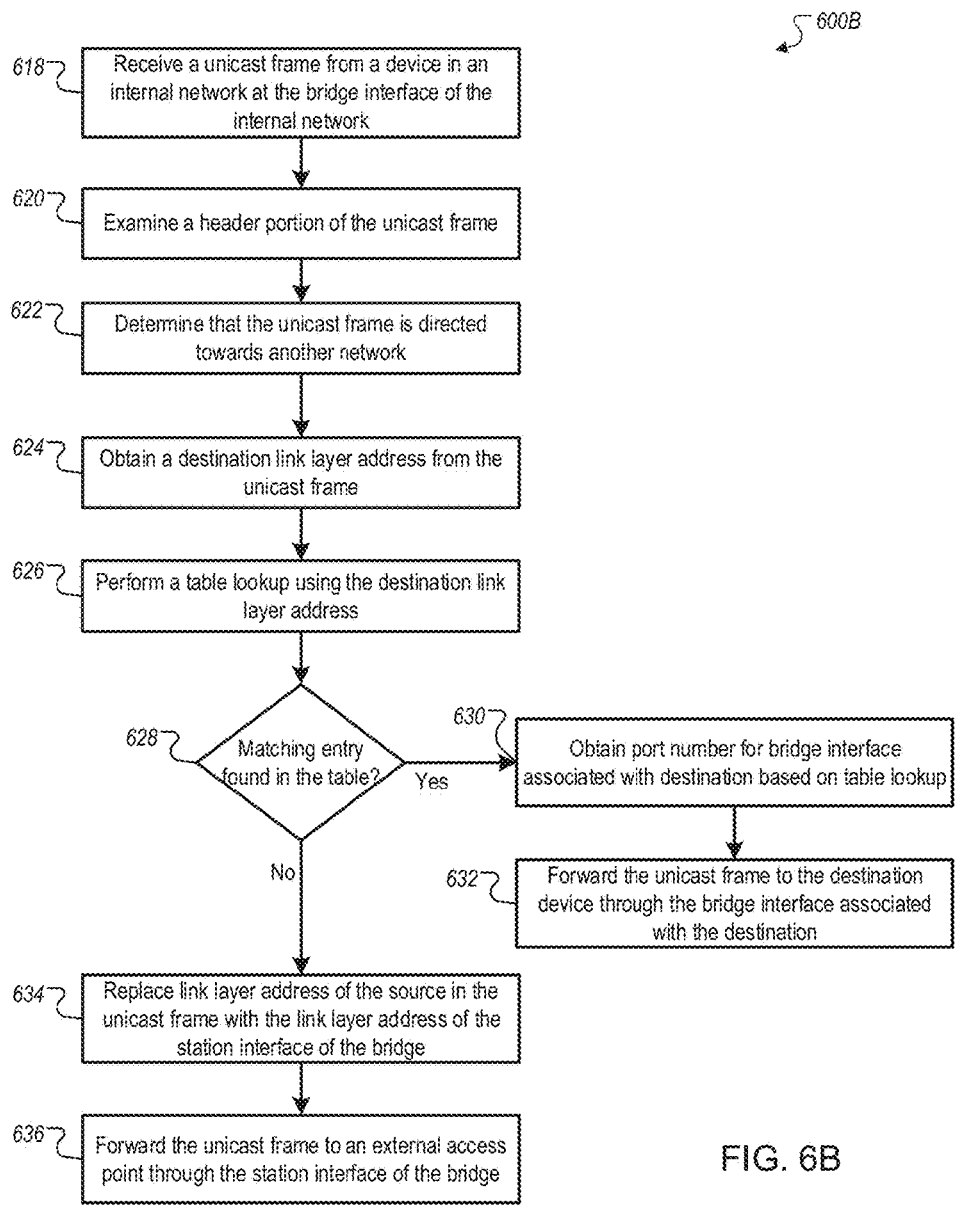

FIGS. 6A and 6B illustrate examples of processes 600A and 600B respectively for handling wireless frames with unicast data by a bridge, according to one or more implementations. The processes 600A and 600B can be performed by the bridge 312, e.g., to handle wireless frames with unicast data exchanged by a station connected to an internal wireless network of the bridge with another station connected to an internal wireless network of the bridge or the external wireless network. Accordingly, the following sections describe the processes 600A and 600B with respect to the bridge 312. However, the processes 600A and 600B also may be performed by other suitable devices.

In some implementations, the processes 600A and 600B are performed by one or more processors associated with the bridge, which execute instructions stored in memory coupled to the bridge device. For example, the CPU 314 performs the processes 600A and 600B by executing instructions corresponding to the firmware packages for the bridge 312. As noted previously, the bridge firmware packages are stored in the memory 116, in some implementations.

The process 600A provides an example of handling a wireless frame with unicast data sent from a station in the external wireless network, e.g., station 304, to a station connected to an internal wireless network of the bridge, e.g., station 322. At 602, a unicast frame is received from a device in an external network. For example, the bridge 312 receives, at the In-STA interface 312c, a wireless frame that is sent from the station 304 to the station 322. The frame is forwarded to the In-STA interface 312c from the Ext-AP 302.

At 604, a header portion of the unicast frame is examined. For example, the bridge 312 examines the fields in the header of the wireless frame.

At 606, a determination is made that the unicast frame is directed towards an internal network. For example, the bridge 312 determines that the "FromDs" field in the header of the wireless frame that is received from the external wireless network at the In-STA interface 312c is set to bit value '1'. Accordingly, the bridge 312 determines that the frame is directed towards a station in an internal wireless network of the bridge.

At 608, a destination network layer address is obtained from the unicast frame. For example, the bridge 312 examines the network layer header encapsulated in the wireless frame and obtains the destination IP address from the network layer header. Accordingly, the bridge 312 uses the IP address of the destination station from the frame payload to perform a lookup of the bridge table 330 to obtain the MAC address of the destination station.

At 610, a table lookup is performed using the destination network layer address. For example, the bridge 312 uses the destination IP address, which is obtained from the network layer information in the frame at 608, as an index for searching entries in the bridge table 330.

At 612, the link layer address of the destination device and corresponding port number for the bridge interface are obtained based on table lookup. For example, based on the table lookup at 610, the bridge 312 finds an entry in the bridge table 330 that corresponds to the station 322, with an IP address that matches the IP address used as the index in the table lookup. The bridge 312 reads, from the matching table entry, the MAC address of the station 322 and the port number corresponding to the In-AP interface 312a at which the station 322 is connected.

At 614, address fields in the unicast frame are updated with the link layer addresses of the first device and the associated bridge interface. For example, the bridge 312 updates the "Target MAC Address" field in the wireless frame header with the MAC address of the station 322 obtained from the matching entry in the bridge table 330. Based on the port number obtained from the matching entry, the bridge 312 determines that the destination station is connected to the In-AP interface 312a, which is associated with the obtained port number. The bridge 312 also replaces the "BSSID Address" field of the wireless frame header with the MAC address of the In-AP interface 312a.

At 616, the unicast frame is forwarded to the destination device through the associated bridge interface. For example, the bridge 312 forwards the updated wireless frame with the unicast data to the destination station 322 through the In-AP interface 312a.

The process 600B provides an example of handling a wireless frame with unicast data sent from a station in an internal wireless network, e.g., station 322, to a station connected to another internal wireless network of the bridge, e.g., station 326, or to a station in the external wireless network, e.g., station 304 or 306. At 618, a unicast frame from a device in an internal network is received at the bridge interface of the internal network. For example, the bridge 312 receives, at the In-AP interface 312a of the first internal wireless network of the bridge 312, a wireless frame with unicast data that is sent from the station 322 in the first internal wireless network.

At 620, a header portion of the unicast frame is examined. For example, the bridge 312 examines the fields in the header of the wireless frame.

At 622, a determination is made that the unicast frame is directed towards another network. For example, the bridge 312 determines that the "ToDs" field in the header of the wireless frame is set to bit value '1'. Accordingly, the bridge 312 determines that the frame is directed towards a station in another wireless network.

At 624, a destination link layer address is obtained from the unicast frame. For example, the bridge 312 obtains the MAC address specified in the "Target MAC Address" field in the wireless frame header.

At 626, a table lookup is performed using the destination link layer address. For example, the bridge 312 uses the destination MAC address, which is obtained from the wireless frame header at 624, as an index for searching entries in the bridge table 330.

At 628, a determination is made whether a matching entry is found in the table. For example, the bridge 312 checks whether the bridge table 330 includes an entry with a MAC address that matches the destination MAC address obtained from the wireless frame header and used as an index for searching the entries in the bridge table.

If a matching entry is found in the table at 628, then at 630, the port number for the bridge interface associated with the destination is obtained based on the table lookup. For example, based on the table lookup at 626 and 628, the bridge 312 finds an entry in the bridge table 330 corresponding to the station 324 or 326, with a MAC address that matches the MAC address used as the index for the table lookup. The bridge 312 reads, from the matching table entry, the port number corresponding to the In-AP interface 312a or 312b at which the station 324 or 326, respectively, is connected.

At 632, the unicast frame is forwarded to the destination device through the bridge interface associated with the destination. For example, the bridge 312 forwards the wireless frame with the unicast data to the destination station 324 through the In-AP interface 312a, or to the destination station 326 through the In-AP interface 312b, as applicable.

On the other hand, if a matching entry is not found in the table at 628, then at 634 the link layer address of the source in the unicast frame is replaced with the link layer address of the station interface of the bridge. For example, if the bridge 312 fails to find a matching entry in the bridge table 330 by performing the table lookup at 626 and 628, this indicates that the destination MAC address specified in the wireless frame header is associated with a station in the external wireless network. Accordingly, the bridge 312 replaces the MAC address of the originating station 322 in the "Source MAC Address" field of the wireless frame header with the MAC address of the In-STA interface 312c.

At 636, the unicast frame is forwarded to an external access point through the station interface of the bridge. For example, the bridge 312 sends the unicast frame, updated at 634, towards the destination station in the external wireless network, by forwarding the unicast frame through the In-STA interface 312c to the Ext-AP 302, which will route the frame to the appropriate destination station.

The disclosed and other examples can be implemented as one or more computer program products, for example, one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless network bridge apparatus comprising:
one or more processors; and
a storage medium storing instructions that, when executed by the one or more processors, are configured to cause the one or more processors to:
control a first network interface to operate as a first station in a first wireless network;
control a second network interface to operate as an access point in a second wireless network;
control a bridge table that includes an entry that associates one or more network addresses of a second station with an identifier for the second network interface, wherein the second station is accessible in the second wireless network through the second network interface operating as the access point in the second wireless network;
receive a packet for communication between the second station and a network device in the first wireless network;
examine the packet to find one or more network addresses included in the packet;
associate the packet with the second station by performing a lookup of the bridge table based on the one or more network addresses included in the packet;
communicate information associated with the packet to the second station through the second network interface; and
communicate information associated with the packet to the network device through the first network interface,
wherein the network device is an external access point in the first wireless network and wherein receiving the packet for communication comprises:
receiving, at the first network interface, an address resolution protocol (ARP) request packet for communication from the external access point to the second station;
forwarding the ARP request packet to the second station through the second network interface;
receiving, at the second network interface, an ARP response packet from the second station, the ARP response packet including a network layer address and a link layer address of the second station;
replacing, in the ARP response packet, the link layer address of the second station with a link layer address of the first network interface; and
forwarding the ARP response packet with the link layer address of the first network interface to the external access point through the first network interface.

2. The apparatus of claim 1, wherein the entry associating the one or more network addresses of the second station with the identifier for the second network interface includes information associating at least one of a network layer address or a link layer address corresponding to the second station with the identifier for the second network interface, wherein the identifier for the second network interface comprises a port number.

3. The apparatus of claim 1, wherein receiving the packet for communication comprises:
receiving, at the second network interface, an address resolution protocol (ARP) request packet for communication from the second station to the network device, the ARP request packet including a network layer address and a link layer address of the second station;
replacing, in the ARP request packet, the link layer address of the second station with a link layer address of the first network interface;
forwarding the ARP request packet with the link layer address of the first network interface to the network device through the first network interface;
receiving, at the first network interface, an ARP response packet from the network device, the ARP response packet including the network layer address of the second station and the link layer address of the first network interface;
associating the ARP response packet with the second station by performing a lookup of the bridge table based on the network layer address of the second station included in the ARP response packet;
obtaining the link layer address of the second station from the bridge table;
replacing, in the ARP response packet, the link layer address of the first network interface with the link layer address of the second station; and
forwarding the ARP response packet with the link layer address of the second station to the second station through the second network interface.

4. The apparatus of claim 3, wherein forwarding the ARP request packet with the link layer address of the first network interface to the network device through the first network interface comprises:
  placing the ARP request packet with the link layer address of the first network interface in a frame buffer associated with the second network interface;
  creating a copy of data in the frame buffer including the ARP request packet with the link layer address of the first network interface;
  associating the copy with the first network interface;
  accessing the ARP request packet with the link layer address of the first network interface from the copy by the first station; and
  sending, by the first station, the ARP request packet with the link layer address of the first network interface to the network device through the first network interface.

5. The apparatus of claim 1, wherein receiving the packet for communication comprises:
  receiving, at the first network interface, a unicast frame from the network device;
  examining one or more fields in a header portion of the unicast frame;
  in response to examining the one or more fields in the header portion, determining that the unicast frame is directed from the first wireless network to the second wireless network;
  obtaining a network layer address included in the unicast frame, the network layer address identifying a destination of the unicast frame;
  associating the obtained network layer address with a network layer address of the second station by performing a lookup of the bridge table;
  obtaining, from the bridge table, a link layer address of the second station and a link layer address of the second network interface;
  updating, in the unicast frame, a first address field with the link layer address of the second station and a second address field with link layer address of the second network interface; and
  forwarding the unicast frame with the updated first and second address fields to the second station through the second network interface.

6. The apparatus of claim 1, further comprising a third network interface that is configured to operate as an access point in a third wireless network, wherein the instructions are configured to cause the one or more processors to:
  control the bridge table to include an entry that associates one or more network addresses of a third station to an identifier for the third network interface, wherein the third station is accessible in the third wireless network through the third network interface operating as the access point in the third wireless network.

7. The apparatus of claim 6, wherein the instructions are further configured to cause the one or more processors to:
  receive, at the second network interface, a unicast frame from the second station;
  examine fields in a header portion of the unicast frame;
  in response to examining the fields in the header portion, determine that the unicast frame is directed from the second wireless network to one of the first wireless network or the third wireless network;
  obtain a link layer address of a destination included in the unicast frame;
  perform a lookup of the bridge table for an entry corresponding to the obtained link layer address;
  in response to determining that the obtained link layer address matches a link layer address of the third station based on the lookup of the bridge table, forward the unicast frame to the third station through the third network interface; and
  in response to determining that an entry corresponding to the obtained link layer address is absent from the bridge table:
    replace, in the unicast frame, a link layer address of the second station with a link layer address of the first network interface, and
    forward, through the first network interface, the unicast frame with the link layer address of the first network interface to an external access point in the first wireless network.

8. The apparatus of claim 6, wherein the instructions are further configured to cause the one or more processors to:
  receive one of a broadcast frame or a multicast frame from the second station;
  forward the broadcast frame or the multicast frame received from the second station through the first network interface, the second network interface and the third network interface;
  receive one of a broadcast frame or a multicast frame from the network device in the first wireless network; and
  forward the broadcast frame or the multicast frame received from the network device through the second network interface and the third network interface.

9. The apparatus of claim 1, wherein the instructions are further configured to cause the one or more processors to:
  control the bridge table to include an entry that associates one or more network addresses of a third station with an internal interface of the apparatus that is indicated by a port number in the entry, wherein the third station is configured to handle network layer packets and is accessible through the internal interface.

10. The apparatus of claim 9, wherein the instructions are further configured to cause the one or more processors to:
  set the third station to a low power state in response to a determination of inactivity associated with the third station exceeding a first threshold time period; and
  set the first station and the access point to a low power state in response to a determination of inactivity associated with the first network interface and the second network interface exceeding a second threshold time period, wherein setting the first station and the access point to the low power state comprises:
    periodically send, through the first network interface, a keep alive packet to an external access point in the first wireless network using a first time interval, and
    periodically wake the second network interface to listen for a signal from the second station using a second time interval.

11. The apparatus of claim 1, wherein the instructions are further configured to cause the one or more processors to:
  upon an initial powering on of the apparatus, obtain, using the first network interface operating as the first station in the first wireless network, a link layer address of an external access point in the first wireless network; and
  determine a link layer address of the second network interface based on the link layer address of the external access point in the first wireless network.

12. The apparatus of claim 11, wherein the instructions are further configured to cause the one or more processors to:
  upon the initial powering on of the apparatus, obtain, using the first network interface operating as the first station in the first wireless network, a password of the external access point in the first wireless network; and
determine a password of the access point in the second wireless network based on the password of the external access point.

13. The apparatus of claim 1, wherein the instructions are further configured to cause the one or more processors to:
receive, at the second network interface, a Dynamic Host Configuration Protocol (DHCP) discovery packet from the second station;
set a boot flag in the DHCP discovery packet to broadcast mode;
forward the DHCP discovery packet to the first wireless network through the first network interface;
receive, at the first network interface, a DHCP response packet from a DHCP server in the first wireless network, including an associated wireless frame header that includes a broadcast link layer address; and
forward the DHCP response packet with the associated wireless frame header to the second station through the second network interface.

14. The apparatus of claim 1, wherein at least one of the first wireless network or the second wireless network is based on an Institute of Electrical and Electronics Engineers (IEEE) 802.11 communications standard.

15. The apparatus of claim 1, wherein the instructions are further configured to cause the one or more processors to:
communicate with an external access point in the first wireless network through the first network interface using a first data rate; and
communicate with the second station in the second wireless network through the second network interface using a second data rate that is distinct from the first data rate.

16. The apparatus of claim 1, wherein the bridge table includes an entry that associates one or more network addresses of a third station to the identifier for the second network interface,
wherein both the second station and the third station are accessible in the second wireless network through the second network interface operating as the access point in the second wireless network.

17. A method comprising:
controlling a first network interface of a wireless network bridge to operate as a first station in a first wireless network;
controlling a second network interface of the wireless network bridge to operate as an access point in a second wireless network;
controlling a bridge table of the wireless network bridge that includes an entry that associates one or more network addresses of a second station with an identifier for the second network interface, wherein the second station is accessible in the second wireless network through the second network interface operating as the access point in the second wireless network;
receiving a packet for communication between the second station and a network device in the first wireless network;
examining the packet to find one or more network addresses included in the packet;
associating the packet with the second station by performing a lookup of the bridge table based on the one or more network addresses included in the packet;
communicating information associated with the packet to the second station through the second network interface; and communicating information associated with the packet to the network device through the first network interface, wherein the network device is an external access point in the first wireless network and wherein receiving the packet for communication comprises:
receiving, at the first network interface, an address resolution protocol (ARP) request packet for communication from the external access point to the second station;
forwarding the ARP request packet to the second station through the second network interface;
receiving, at the second network interface, an ARP response packet from the second station, the ARP response packet including a network layer address and a link layer address of the second station;
replacing, in the ARP response packet, the link layer address of the second station with a link layer address of the first network interface; and
forwarding the ARP response packet with the link layer address of the first network interface to the external access point through the first network interface.

18. The method of claim 17, wherein the entry associating the one or more network addresses of the second station with the identifier for the second network interface includes information associating at least one of a network layer address or a link layer address corresponding to the second station with the identifier for the second network interface, wherein the identifier for the second network interface comprises a port number.

19. The method of claim 17, wherein receiving the packet for communication comprises:
receiving, at the second network interface, an address resolution protocol (ARP) request packet for communication from the second station to the network device, the ARP request packet including a network layer address and a link layer address of the second station;
replacing, in the ARP request packet, the link layer address of the second station with a link layer address of the first network interface;
forwarding the ARP request packet with the link layer address of the first network interface to the network device through the first network interface;
receiving, at the first network interface, an ARP response packet from the network device, the ARP response packet including the network layer address of the second station and the link layer address of the first network interface;
associating the ARP response packet with the second station by performing a lookup of the bridge table based on the network layer address of the second station included in the ARP response packet;
obtaining the link layer address of the second station from the bridge table;
replacing, in the ARP response packet, the link layer address of the first network interface with the link layer address of the second station; and
forwarding the ARP response packet with the link layer address of the second station to the second station through the second network interface.

20. The method of claim 19, wherein forwarding the ARP request packet with the link layer address of the first network interface to the network device through the first network interface comprises:
placing the ARP request packet with the link layer address of the first network interface in a frame buffer associated with the second network interface;

creating a copy of data in the frame buffer including the ARP request packet with the link layer address of the first network interface;
associating the copy with the first network interface;
accessing the ARP request packet with the link layer address of the first network interface from the copy by the first station; and
sending, by the first station, the ARP request packet with the link layer address of the first network interface to the network device through the first network interface.

21. The method of claim 17, wherein receiving the packet for communication comprises:
receiving, at the first network interface, a unicast frame from the network device;
examining one or more fields in a header portion of the unicast frame;
in response to examining the one or more fields in the header portion, determining that the unicast frame is directed from the first wireless network to the second wireless network;
obtaining a network layer address included in the unicast frame, the network layer address identifying a destination of the unicast frame;
associating the obtained network layer address with a network layer address of the second station by performing a lookup of the bridge table;
obtaining, from the bridge table, a link layer address of the second station and a link layer address of the second network interface;
updating, in the unicast frame, a first address field with the link layer address of the second station and a second address field with link layer address of the second network interface; and
forwarding the unicast frame with the updated first and second address fields to the second station through the second network interface.

22. The method of claim 17, further comprising:
controlling the bridge table to include an entry that associates one or more network addresses of a third station to an identifier for a third network interface that is configured to operate as an access point in a third wireless network, wherein the third station is accessible in the third wireless network through the third network interface operating as the access point in the third wireless network.

23. The method of claim 22, further comprising:
receiving, at the second network interface, a unicast frame from the second station;
examining fields in a header portion of the unicast frame;
in response to examining the fields in the header portion, determining that the unicast frame is directed from the second wireless network to one of the first wireless network or the third wireless network;
obtaining a link layer address of a destination included in the unicast frame;
performing a lookup of the bridge table for an entry corresponding to the obtained link layer address;
in response to determining that the obtained link layer address matches a link layer address of the third station based on the lookup of the bridge table, forwarding the unicast frame to the third station through the third network interface; and
in response to determining that an entry corresponding to the obtained link layer address is absent from the bridge table:
replacing, in the unicast frame, a link layer address of the second station with a link layer address of the first network interface, and
forwarding, through the first network interface, the unicast frame with the link layer address of the first network interface to an external access point in the first wireless network.

24. The method of claim 22, further comprising:
receiving one of a broadcast frame or a multicast frame from the second station;
forwarding the broadcast frame or the multicast frame received from the second station through the first network interface, the second network interface and the third network interface;
receiving one of a broadcast frame or a multicast frame from the network device in the first wireless network; and
forwarding the broadcast frame or the multicast frame received from the network device through the second network interface and the third network interface.

25. The method of claim 17, further comprising:
controlling the bridge table to include an entry that associates one or more network addresses of a third station with an internal interface of the wireless network bridge that is indicated by a port number in the entry, wherein the third station is configured to handle network layer packets and is accessible through the internal interface.

26. The method of claim 25, further comprising:
setting the third station to a low power state in response to a determination of inactivity associated with the third station exceeding a first threshold time period; and
setting the first station and the access point to a low power state in response to a determination of inactivity associated with the first network interface and the second network interface exceeding a second threshold time period, wherein setting the first station and the access point to the low power state comprises:
periodically sending, through the first network interface, a keep alive packet to an external access point in the first wireless network using a first time interval, and
periodically waking the second network interface to listen for a signal from the second station using a second time interval.

27. The method of claim 17, further comprising:
upon an initial powering on of the wireless network bridge, obtaining, using the first network interface operating as the first station in the first wireless network, a link layer address of an external access point in the first wireless network; and
determining a link layer address of the second network interface based on the link layer address of the external access point in the first wireless network.

28. The method of claim 27, further comprising:
upon the initial powering on of the wireless network bridge, obtaining, using the first network interface operating as the first station in the first wireless network, a password of the external access point in the first wireless network; and
determining a password of the access point in the second wireless network based on the password of the external access point.

29. The method of claim 17, further comprising:
receiving, at the second network interface, a Dynamic Host Configuration Protocol (DHCP) discovery packet from the second station;

setting a boot flag in the DHCP discovery packet to broadcast mode;

forwarding the DHCP discovery packet to the first wireless network through the first network interface;

receiving, at the first network interface, a DHCP response packet from a DHCP server in the first wireless network, including an associated wireless frame header that includes a broadcast link layer address; and forwarding the DHCP response packet with the associated wireless frame header to the second station through the second network interface.

30. The method of claim 17, wherein at least one of the first wireless network or the second wireless network is based on an Institute of Electrical and Electronics Engineers (IEEE) 802.11 communications standard.

31. The method of claim 17, further comprising:

communicating with an external access point in the first wireless network through the first network interface using a first data rate; and communicating with the second station in the second wireless network through the second network interface using a second data rate that is distinct from the first data rate.

32. The method of claim 17, wherein the bridge table includes an entry that associates one or more network addresses of a third station to the identifier for the second network interface, wherein both the second station and the third station are accessible in the second wireless network through the second network interface operating as the access point in the second wireless network.

* * * * *